(12) United States Patent
Han et al.

(10) Patent No.: US 11,438,739 B2
(45) Date of Patent: Sep. 6, 2022

(54) MULTI-CONNECTIVITY DATA VOLUME REPORTING METHOD

(71) Applicant: HUAWEI TECHNOLOGIES CO., LTD., Guangdong (CN)

(72) Inventors: Feng Han, Shanghai (CN); Yinghao Jin, Shanghai (CN); Wei Tan, Shanghai (CN); Liwei Qiu, Shenzhen (CN)

(73) Assignee: Huawei Technologies Co., Ltd., Guangdong (CN)

(*) Notice: Subject to any disclaimer, the term of this patent is extended or adjusted under 35 U.S.C. 154(b) by 26 days.

(21) Appl. No.: 17/008,911

(22) Filed: Sep. 1, 2020

(65) Prior Publication Data

US 2020/0396631 A1 Dec. 17, 2020

Related U.S. Application Data

(63) Continuation of application No. PCT/CN2019/082404, filed on Apr. 12, 2019.

(30) Foreign Application Priority Data

Mar. 2, 2018 (CN) .......................... 201810175316.2

(51) Int. Cl.
*H04L 12/14* (2006.01)
*H04M 15/00* (2006.01)
(Continued)

(52) U.S. Cl.
CPC ........... *H04W 4/24* (2013.01); *H04L 12/1407* (2013.01); *H04L 12/1435* (2013.01);
(Continued)

(58) Field of Classification Search
CPC ......... H04B 7/02–0495; H04B 17/0082–3913; H04L 12/14–1496; H04L 45/24–245;
(Continued)

(56) References Cited

U.S. PATENT DOCUMENTS

2015/0043435 A1* 2/2015 Blankenship ....... H04W 28/085
2017/0317894 A1 11/2017 Dao et al.
(Continued)

FOREIGN PATENT DOCUMENTS

CN 104144512 A 11/2014
CN 104202768 A 12/2014
(Continued)

OTHER PUBLICATIONS

Nokia et al., "Multi-connectivity considerations for New Radio." 3GPP TSG-RAN WG2 Meeting #93bis, R2-162499, Dubrovnik, Croatia, Apr. 11-15, 2016, R2-162499, 3 pages.
(Continued)

*Primary Examiner* — Timothy J Weidner
(74) *Attorney, Agent, or Firm* — Fish & Richardson P.C.

(57) ABSTRACT

This patent application provides a multi-connectivity data reporting method, including: obtaining, by a first network device, a first data volume report, where the first data volume report is used to indicate a volume of data that are of a terminal device and that pass through a second network device; and sending, by the first network device, the first data volume report to a third network device. The first data volume report includes one or more of QoS flow identifiers (QFIs) of one or more quality of service QoS flows, identifiers of one or more protocol data unit (PDU) sessions to which the one or more QoS flows belong, or data volumes of the one or more QoS flows.

14 Claims, 7 Drawing Sheets

(51) Int. Cl.

| | |
|---|---|
| *H04W 4/24* | (2018.01) |
| *H04W 24/08* | (2009.01) |
| *H04W 24/10* | (2009.01) |
| *H04W 28/02* | (2009.01) |
| *H04W 76/11* | (2018.01) |
| *H04W 76/15* | (2018.01) |
| *H04W 84/02* | (2009.01) |
| *H04W 88/08* | (2009.01) |
| *H04W 88/18* | (2009.01) |
| *H04W 92/02* | (2009.01) |
| *H04W 92/12* | (2009.01) |
| *H04W 92/20* | (2009.01) |

(52) U.S. Cl.
CPC ....... *H04M 15/66* (2013.01); *H04M 15/8016* (2013.01); *H04M 15/8214* (2013.01); *H04M 15/8228* (2013.01); *H04W 24/08* (2013.01); *H04W 24/10* (2013.01); *H04W 28/0215* (2013.01); *H04W 28/0252* (2013.01); *H04W 28/0268* (2013.01); *H04W 28/0278* (2013.01); *H04W 76/11* (2018.02); *H04W 76/15* (2018.02); *H04M 2215/2026* (2013.01); *H04M 2215/32* (2013.01); *H04M 2215/782* (2013.01); *H04M 2215/7833* (2013.01); *H04W 84/02* (2013.01); *H04W 88/08* (2013.01); *H04W 88/18* (2013.01); *H04W 92/02* (2013.01); *H04W 92/12* (2013.01); *H04W 92/20* (2013.01)

(58) Field of Classification Search
CPC ...... H04L 47/10–41; H04M 15/04–93; H04M 2215/01–96; H04W 4/24; H04W 24/02–10; H04W 28/02–26; H04W 36/0005–385; H04W 60/005–06; H04W 76/10–50; H04W 84/02–16; H04W 88/005–188; H04W 92/02–24
See application file for complete search history.

(56) References Cited

U.S. PATENT DOCUMENTS

| | | | |
|---|---|---|---|
| 2017/0359749 A1 | 12/2017 | Dao | |
| 2019/0215730 A1* | 7/2019 | Qiao | H04W 28/0268 |
| 2020/0213894 A1* | 7/2020 | Agiwal | H04W 28/0263 |

FOREIGN PATENT DOCUMENTS

| | | |
|---|---|---|
| CN | 104581948 A | 4/2015 |
| CN | 106535269 A | 3/2017 |
| CN | 109547176 A | 3/2019 |

OTHER PUBLICATIONS

3GPP TS 23.401 V15.2.0 (Dec. 2017), 3rd Generation Partnership Project,Technical Specification Group Services and System Aspects,General Packet Radio Service (GPRS) enhancements for Evolved Universal Terrestrial Radio Access Network (E-UTRAN) access(Release 15), 404 pages.

3GPP TS 23.501 V15.0.0 (Dec. 2017), 3rd Generation Partnership Project,Technical Specification Group Services and System Aspects, System Architecture for the 5G System,Stage 2(Release 15), 181 pages.

ZTE, "Consideration on Multi-Connectivity with Dual/Multiple gNB-Dus." 3GPP TSG RAN WG3 Meeting#1801ad-hoc, R3-180039, Sophia-Antipolice, France, Jan. 22-26, 2018, 5 pages.

3GPP TS 36.300 V15.0.0 (Dec. 2017), 3rd Generation Partnership Project,Technical Specification Group Radio Access Network,Evolved Universal Terrestrial Radio Access (E-UTRA) and Evolved Universal Terrestrial Radio Access Network (E-UTRAN),Overall description,Stage 2(Release 15), 338 pages.

3GPP TS 23.501 V0.3.0 (Feb. 2017), 3rd Generation Partnership Project,Technical Specification Group Services and System Aspects, System Architecture for the 5G System,Stage 2(Release 15), 97 pages.

3GPP TS 37.340 V15.0.0 (Dec. 2017), 3rd Generation Partnership Project,Technical Specification Group Radio Access Network,Evolved Universal Terrestrial Radio Access (E-UTRA) and NR,Multi-connectivity,Stage 2 (Release 15), 51 pages.

3GPP TS 38.413 V0.6.0 (Jan. 2018), 3rd Generation Partnership Project,Technical Specification Group Radio Access Network,NG-RAN,NG Application Protocol (NGAP)(Release 15), 94 pages.

3GPP TS 38.423 V0.6.0 (Jan. 2018), 3rd Generation Partnership Project,Technical Specification Group Radio Access Network,NG-RAN,Xn application protocol (XnAP)(Release 15), 76 page.

Nokia et al., "Data volume reporting for MR-DC with 5GC." 3GPP TSG-RAN WG3#103, R3-190930, Athens, Greece, Feb. 25-Mar. 1, 2018, 25 pages.

Office Action issued in Chinese Application No. 201910768551.5 dated Apr. 28, 2020, 17 pages (With English Translation).

PCT International Search Report and Written Opinion in International Application No. PCT/CN2019/082,404, dated Jul. 24, 2019, 18 pages (With English Translation).

Office Action issued in Chinese Application No. 201810175316.2 dated Sep. 23, 2020, 15 pages (with English translation).

* cited by examiner

MULTI-CONNECTIVITY DATA VOLUME REPORTING METHOD

CROSS-REFERENCE TO RELATED APPLICATIONS

This application is a continuation of International Application No. PCT/CN2019/082404, filed on Apr. 12, 2019, which claims priority to Chinese Patent Application No. 201810175316.2, filed on Mar. 2, 2018. The disclosures of the aforementioned applications are hereby incorporated by reference in their entireties.

TECHNICAL FIELD

The present invention relates to the wireless communication field, and in particular, to a multi-connectivity data volume reporting method and apparatus.

BACKGROUND

With rapid development of wireless communications technologies, a 5th generation (5G) wireless communications technology currently has become a hot topic in the industry. 5G supports a variety of application requirements, including: support of an access capability with higher-rate experience and wider bandwidth, information exchange with a lower latency and high reliability, access and management of more massive machine type communication devices with low costs, and the like. In addition, 5G supports a variety of vertical industry application scenarios, such as interact of vehicles, emergency communications, and the industrial Internet. For these performance requirements and application scenarios of 5G, a network imposes a higher requirement on quality of service (QoS) of a communication service. Therefore, QoS management based on an evolved packet system (EPS) bearer in a conventional LTE system is no longer suitable. 5G defines a QoS flow based QoS management framework. A QoS flow is a finest granularity for a terminal device to implement QoS differentiation in a variety of service communication with a network, that is, the network can schedule and forward a communication service for the terminal device on a QoS flow basis.

In the LTE system, a terminal device may be separately connected to two evolved NodeBs (eNB) through dual connectivity, and then is connected to an LTE core network by using the two eNBs. Similarly, in a deployment scenario of a 5G system, a terminal device is connected to a plurality of access network nodes through multi-connectivity, and is connected to a 5G core (5GC) network by using the plurality of access network nodes. In this scenario, charging of a communication service of the terminal device involves different access network nodes, and is related to data volumes of the communication service that passes through the different access network nodes. To implement effective and accurate charging, data volumes of different service data carried by all access network nodes for a terminal device need to be accurately counted in a timely manner and reported to a core network. Currently, there is no proper solution to effectively count volumes of data carried by a plurality of access network nodes for a terminal device in a 5G network.

SUMMARY

Embodiments of this application provide a multi-connectivity data volume reporting method, so that volumes of data that is of a multi-connectivity terminal device and that passes through one or more access network nodes are reported to a core network, to provide a basis for network traffic charging of the terminal device.

According to a first aspect, an embodiment of this application provides a multi-connectivity data volume reporting method, and the method includes: obtaining, by a first network device, a first data volume report, where the first data volume report is used to indicate a volume of data that is of a terminal device and that passes through a second network device, and the first data volume report includes QoS flow identifiers QFIs of one or more quality of service QoS flows, identifiers of protocol data unit PDU sessions to which the one or more QoS flows belong, and data volumes of the one or more QoS flows; and sending, by the first network device, the first data volume report to a third network device.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, and the second data volume report includes QFIs of one or more QoS flows, identifiers of PDU sessions to which the one or more QoS flows belong, and data volumes of the one or more QoS flows; and obtaining, by the first network device, the first data volume report based on the second data volume report.

In a possible implementation, for a master node MN terminated bearer, the obtaining, by a first network device, a first data volume report includes: counting, by the first network device, the volume of the data that is of the terminal device and that passes through the second network device; and forming, by the first network device, the first data volume report based on the data volume.

In a possible implementation, the first data volume report further includes bearer types of the one or more QoS flows and/or identifiers of network slices to which the one or more QoS flows belong.

In a possible implementation, the second data volume report further includes at least one of identifiers of data radio bearers DRBs to which the one or more QoS flows are mapped, bearer types of the one or more QoS flows, and identifiers of network slices to which the one or more QoS flows belong.

In a possible implementation, the data volumes of the one or more QoS flows are volumes of data that is of the terminal device and that passes through a secondary cell group SCG bearer and/or a split bearer of the second network device.

In a possible implementation, the first network device is an MN connected to the terminal device, the second network device is an SN connected to the terminal device, and the third network device is a 5GC node.

According to the data volume reporting method provided in this embodiment of this application, the MN reports, to the 5GC node, a volume of data that is of the multi-connectivity terminal device and that passes through the SN, so that the 5GC can obtain the volume of the data that is of the terminal device and that passes through the SN at a QoS flow granularity, to provide a basis for network traffic charging of the terminal device.

According to a second aspect, an embodiment of this application provides a multi-connectivity data volume reporting method, and the method includes: obtaining, by a first network device, a first data volume report, where the first data volume report is used to indicate a volume of data that is of a terminal device and that passes through a second network device, the first data volume report includes data volume information of one or more quality of service QoS flow groups, and data volume information of one QoS flow group includes QoS flow identifiers QFIs of one or more QoS flows in the QoS flow group, identifiers of protocol data unit PDU sessions to which the one or more QoS flows belong, and a sum of data volumes of all QoS flows in the QoS flow group; and sending, by the first network device, the first data volume report to a third network device.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, and the second data volume report includes QoS of one or more QoS flows, identifiers of PDU sessions to which the one or more QoS flows belong, and data volumes of the one or more QoS flows; and obtaining, by the first network device, the first data volume report based on the second data volume report.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, the second data volume report includes data volume information of one or more QoS flow groups, and data volume information of one QoS flow group includes QFIs of one or more QoS flows in the QoS flow group, identifiers of PDU sessions to which the one or more QoS flows belong, and a sum of data volumes of all QoS flows in the QoS flow group; and obtaining, by the first network device, the first data volume report based on the second data volume report.

In a possible implementation, for a master node MN terminated bearer, the obtaining, by a first network device, a first data volume report includes: counting, by the first network device, the volume of the data that is of the terminal device and that passes through the second network device; and forming, by the first network device, the first data volume report based on the data volume.

In a possible implementation, the data volumes of the one or more QoS flows are volumes of data that is of the terminal device and that passes through a secondary cell group SCG bearer and/or a split bearer of the second network device.

In a possible implementation, the first network device is an MN connected to the terminal device, the second network device is an SN connected to the terminal device, and the third network device is a 5GC node.

According to the data volume reporting method provided in this embodiment of this application, the MN reports, to the 5GC node, a volume of data that is of the multi-connectivity terminal device and that passes through the SN, so that the 5GC can obtain the volume of the data that is of the terminal device and that passes through the SN at a QoS flow group granularity, to provide a basis for network traffic charging of the terminal device.

According to a third aspect, an embodiment of this application provides a multi-connectivity data volume reporting method, and the method includes: obtaining, by a first network device, a first data volume report, where the first data volume report is used to indicate a volume of data that is of a terminal device and that passes through a second network device, the first data volume report includes identifiers of one or more protocol data unit PDU sessions and data volume information of the one or more PDU sessions, and data volume information of one PDU session includes QoS flow identifiers QFIs of one or more quality of service QoS flows of the PDU session and a sum of data volumes of all of the one or more QoS flows; and sending, by the first network device, the first data volume report to a third network device.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, and the second data volume report includes QFIs of one or more QoS flows, identifiers of PDU sessions to which the one or more QoS flows belong, and data volumes of the one or more QoS flows; and obtaining, by the first network device, the first data volume report based on the second data volume report.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, the second data volume report includes data volume information of one or more QoS flow groups, and data volume information of one QoS flow group includes QFIs of one or more QoS flows in the QoS flow group, identifiers of PDU sessions to which the one or more QoS flows belong, and a sum of data volumes of all QoS flows in the QoS flow group; and obtaining, by the first network device, the first data volume report based on the second data volume report.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, the second data volume report includes identifiers of one or more PDU sessions and data volume information of the one or more PDU sessions, and data volume information of one PDU session includes QFIs of one or more QoS flows of the PDU session and a sum of data volumes of all of the one or more QoS flows; and obtaining, by the first network device, the first data volume report based on the second data volume report, In a possible implementation, for a master node MN terminated bearer, the obtaining, by a first network device, a first data volume report includes: counting, by the first network device, the volume of the data that is of the terminal device and that passes through the second network device; and forming, by the first network device, the first data volume report based on the data volume.

In a possible implementation, the data volumes of the one or more QoS flows are volumes of data that is of the terminal device and that passes through a secondary cell group SCG bearer and/or a split bearer of the second network device.

In a possible implementation, the first network device is an MN connected to the terminal device, the second network device is an SN connected to the terminal device, and the third network device is a 5GC node.

According to the data volume reporting method provided in this embodiment of this application, the MN reports, to the 5GC node, a volume of data that is of the multi-connectivity terminal device and that passes through the SN, so that the 5GC can obtain the volume of the data that is of the terminal device and that passes through the SN at a PDU session granularity, to provide a basis for network traffic charging of the terminal device.

According to a fourth aspect, an embodiment of this application provides a multi-connectivity data volume reporting method, and the method includes: obtaining, by a first network device, a first data volume report, where the first data volume report is used to indicate a volume of data that is of a terminal device and that passes through a second network device, the first data volume report includes identifiers of one or more network slices and data volume information of the one or more network slices, and data volume information of one network slice includes QoS flow identifiers QFIs of one or more quality of service QoS flows of the network slice, identifiers of protocol data unit MU sessions to which the one or more QoS flows belong, and a sum of data volumes of all of the one or more QoS flows; and sending, by the first network device, the first data volume report to a third network device.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, and the second data volume report includes QFIs of one or more QoS flows, identifiers of MU sessions to which the one or more QoS flows belong, and data volumes of the one or more QoS flows; and obtaining, by the first network device, the first data volume report based on the second data volume report.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, the second data volume report includes data volume information of one or more QoS flow groups, and data volume information of one QoS flow group includes QFIs of one or more QoS flows in the QoS flow group, identifiers of PDU sessions to which the one or more QoS flows belong, and a sum of data volumes of all QoS flows in the QoS flow group; and obtaining, by the first network device, the first data volume report based on the second data volume report.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, the second data volume report includes identifiers of one or more PDU sessions and data volume information of the one or more PDU sessions, and data volume information of one PDU session includes QFIs of one or more QoS flows of the PDU session and a sum of data volumes of all of the one or more QoS flows; and obtaining, by the first network device, the first data volume report based on the second data volume report.

In a possible implementation, for a secondary node SN terminated bearer, the obtaining, by a first network device, a first data volume report includes: receiving, by the first network device, a second data volume report sent by the second network device, where the second data volume report is used to indicate the volume of the data that is of the terminal device and that passes through the second network device, the second data volume report includes identifiers of one or more network slices and data volume information of the one or more network slices, and data volume information of one network slice includes QFIs of one or more QoS flows of the network slice, identifiers of PDU sessions to which the one or more QoS flows belong, and a sum of data volumes of all of the one or more QoS flows; and obtaining, by the first network device, the first data volume report based on the second data volume report.

In a possible implementation, for a master node MN terminated bearer, the obtaining, by a first network device, a first data volume report includes: counting, by the first network device, the volume of the data that is of the terminal device and that passes through the second network device; and forming, by the first network device, the first data volume report based on the data volume.

In a possible implementation, the data volumes of the one or more QoS flows are volumes of data that is of the terminal device and that passes through a secondary cell group SCG bearer and/or a split bearer of the second network device.

In a possible implementation, the first network device is an MN connected to the terminal device, the second network device is an SN connected to the terminal device, and the third network device is a 5GC node.

According to the data volume reporting method provided in this embodiment of this application, the MN reports, to the 5GC node, a volume of data that is of the multi-connectivity terminal device and that passes through the SN, so that the 5GC can obtain the volume of the data that is of the terminal device and that passes through the SN at a network slice granularity, to provide a basis for network traffic charging of the terminal device.

According to a fifth aspect, an embodiment of this application provides a multi-connectivity data volume reporting method, and the method includes: receiving, by a first network device, a second data volume report sent by a second network device, where the second data volume report is used to indicate volumes of data that is of a terminal device and that passes through one or more third network devices connected to the second network device, the second data volume report includes data volume information of the one or more third network devices, and data volume information of one third network device includes QoS flow identifiers QFIs of one or more quality of service QoS flows that are of the terminal device and that pass through the third network device, identifiers of protocol data unit PDU sessions to which the one or more QoS flows belong, and data volumes of the one or more QoS flows; obtaining, by the first network device, a first data volume report based on the second data volume report; and sending, by the first network device, the first data volume report to a fourth network device.

In a possible implementation, the second data volume report further includes at least one of identifiers of the one or more third network devices, identifiers of data radio bearers DRBs to which the one or more QoS flows are mapped, and identifiers of network slices to which the one or more QoS flows belong.

In a possible implementation, the first data volume report includes data volume information of the one or more third network devices, and data volume information of one third network device includes QFIs of one or more QoS flows that are of the terminal device and that pass through the third network device, identifiers of PDU sessions to which the one or more QoS flows belong, and data volumes of the one or more QoS flows.

In a possible implementation, the first data volume report includes data volume information of the one or more third network devices, data volume information of one third network device includes data volume information of one or more QoS flow groups that are of the terminal device and that pass through the third network device, and data volume information of one QoS flow group includes QFIs of one or more QoS flows in the QoS flow group, identifiers of PDU sessions to which the one or more QoS flows belong, and a sum of data volumes of all QoS flows in the QoS flow group.

In a possible implementation, the first data volume report includes data volume information of the one or more third network devices, data volume information of one third network device includes identifiers of one or more PDU sessions that are of the terminal device and that pass through the third network device and data volume information of the one or more PDU sessions, and data volume information of one PDU session includes QFIs of one or more QoS flows of the PDU session and a sun of data volumes of all of the one or more QoS flows.

In a possible implementation, the first data volume report includes data volume information of the one or more third network devices, data volume information of one third network device includes identifiers of one or more network slices that are of the terminal device and that pass through the third network device and data volume information of the one or more network slices, and data volume information of one network slice includes QFs of one or more QoS flows of the network slice, identifiers of PDU sessions to which the one or more QoS flows belong, and a sum of data volumes of all of the one or more QoS flows.

In a possible implementation, the first network device is a central unit-control plane function node CU-CP connected to the terminal device, the second network device is a central unit-user plane function node CU-UP connected to the terminal device, the third network device is a distributed unit node DU connected to the terminal device, and the fourth network device is a 5GC node.

According to the data volume reporting method provided in this embodiment of this application, the CU-CP reports, to the 5GC node, a volume of data that is of the multi-connectivity terminal device and that passes through each DU, so that the 5GC can obtain the volume of the data that is of the terminal device and that passes through each DU at a QoS flow granularity, to provide a basis for network traffic charging of the terminal device.

According to a sixth aspect, an embodiment of this application provides a multi-connectivity data volume reporting method, and the method includes: receiving, by a first network device, a second data volume report sent by a second network device, where the second data volume report is used to indicate volumes of data that is of a terminal device and that passes through one or more third network devices connected to the second network device, the second data volume report includes data volume information of the one or more third network devices, data volume information of one third network device includes data volume information of one or more quality of service QoS flow groups that are of the terminal device and that pass through the third network device, and data volume information of one QoS flow group includes QoS flow identifiers QFIs of one or more QoS flows in the QoS flow group, identifiers of PDU sessions to which the one or more QoS flows belong, and a sum of data volumes of all of the one or more QoS flows; obtaining, by the first network device, a first data volume report based on the second data volume report; and sending, by the first network device, the first data volume report to a fourth network device.

In a possible implementation, the second data volume report further includes at least one of identifiers of the one or more third network devices, identifiers of data radio bearers DRBs to which the one or more QoS flows are mapped, and identifiers of network slices to which the one or more QoS flows belong.

In a possible implementation, the first data volume report includes data volume information of the one or more third network devices, data volume information of one third network device includes data volume information of one or more QoS flow groups that are of the terminal device and that pass through the third network device, and data volume information of one QoS flow group includes QFIs of one or more QoS flows in the QoS flow group, identifiers of PDU sessions to which the one or more QoS flows belong, and a sum of data volumes of all of the one or more QoS flows.

In a possible implementation, the first data volume report includes data volume information of the one or more third network devices, data volume information of one third network device includes identifiers of one or more PDU sessions that are of the terminal device and that pass through the third network device and data volume information of the one or more PDU sessions, and data volume information of one PDU session includes QFIs of one or more QoS flows of the PDU session and a sum of data volumes of all of the one or more QoS flows.

In a possible implementation, the first data volume report includes data volume information of the one or more third network devices, data volume information of one third network device includes identifiers of one or more network slices that are of the terminal device and that pass through the third network device and data volume information of the one or more network slices, and data volume information of one network slice includes QFIs of one or more QoS flows of the network slice, identifiers of PDU sessions to which the one or more QoS flows belong, and a sum of data volumes of all of the one or more QoS flows.

In a possible implementation, the first network device is a central unit-control plane function node CU-CP connected to the terminal device, the second network device is a central unit-user plane function node CU-UP connected to the terminal device, the third network device is a distributed unit node DU connected to the terminal device, and the fourth network device is a 5GC node.

According to the data volume reporting method provided in this embodiment of this application, the CU-CP reports, to the 5GC node, a volume of data that is of the multi-connectivity terminal device and that passes through each DU, so that the 5GC can obtain the volume of the data that is of the terminal device and that passes through each DU at a QoS flow group granularity, to provide a basis for network traffic charging of the terminal device.

According to a seventh aspect, an embodiment of this application provides a multi-connectivity data volume reporting method, and the method includes: receiving, by a first network device, a second data volume report sent by a second network device, where the second data volume report is used to indicate volumes of data that is of a terminal device and that passes through one or more third network devices connected to the second network device, the second data volume report includes data volume information of the one or more third network devices, data volume information of one third network device includes identifiers of one or more protocol data unit PDU sessions that are of the terminal device and that pass through the third network device and data volume information of the one or more PDU sessions, and data volume information of one PDU session includes QoS flow identifiers QFIs of one or more quality of service QoS flows of the PDU session and a sum of data volumes of all of the one or more QoS flows; obtaining, by the first network device, a first data volume report based on the second data volume report; and sending, by the first network device, the first data volume report to a fourth network device.

In a possible implementation, the second data volume report further includes at least one of identifiers of the one or more third network devices, identifiers of data radio bearers DRBs to which the one or more QoS flows are mapped, and identifiers of network slices to which the one or more QoS flows belong.

In a possible implementation, the first data volume report includes data volume information of the one or more third network devices, data volume information of one third network device includes identifiers of one or more PDU sessions that are of the terminal device and that pass through the third network device and data volume information of the one or more PDU sessions, and data volume information of one PDU session includes QFIs of one or more QoS flows of the PDU session and a sum of data volumes of all of the one or more QoS flows.

In a possible implementation, the first data volume report includes data volume information of the one or more third network devices, data volume information of one third network device includes identifiers of one or more network slices that are of the terminal device and that pass through the third network device and data volume information of the one or more network slices, and data volume information of one network slice includes QFIs of one or more QoS flows of the network slice, identifiers of PDU sessions to which the one or more QoS flows belong, and a sum of data volumes of all of the one or more QoS flows.

In a possible implementation, the first network device is a central unit-control plane function node CU-CP connected to the terminal device, the second network device is a central unit-user plane function node CU-UP connected to the terminal device, the third network device is a distributed unit node DU connected to the terminal device, and the fourth network device is a 5GC node.

According to the data volume reporting method provided in this embodiment of this application, the CU-CP reports, to the 5GC node, a volume of data that is of the multi-connectivity terminal device and that passes through each DU, so that the 5GC can obtain the volume of the data that is of the terminal device and that passes through each DU at a PDU session granularity, to provide a basis for network traffic charging of the terminal device.

According to an eighth aspect, an embodiment of this application provides a multi-connectivity data volume reporting method, and the method includes: receiving, by a first network device, a second data volume report sent by a second network device, where the second data volume report is used to indicate volumes of data that is of a terminal device and that passes through one or more third network devices connected to the second network device, the second data volume report includes data volume information of the one or more third network devices, data volume information of one third network device includes identifiers of one or more network slices that are of the terminal device and that pass through the third network device and data volume information of the one or more network slices, and data volume information of one network slice includes QoS flow identifiers QM of one or more quality of service QoS flows of the network slice, identifiers of protocol data unit PDU sessions to which the one or more QoS flows belong, and a sum of data volumes of all of the one or more QoS flows; obtaining, by the first network device, a first data volume report based on the second data volume report; and sending, by the first network device, the first data volume report to a fourth network device.

In a possible implementation, the second data volume report further includes at least one of identifiers of the one or more third network devices, identifiers of data radio bearers DRBs to which the one or more QoS flows are mapped, and an identifier of the network slice to which the one or more QoS flows belong.

In a possible implementation, the first data volume report includes data volume information of the one or more third network devices, data volume information of one third network device includes identifiers of one or more network slices that are of the terminal device and that pass through the third network device and data volume information of the one or more network slices, and data volume information of one network slice includes QFIs of one or more QoS flows of the network slice, identifiers of PDU sessions to which the one or more QoS flows belong, and a sum of data volumes of all of the one or more QoS flows.

In a possible implementation, the first network device is a central unit-control plane function node CU-CP connected to the terminal device, the second network device is a central unit-user plane function node CU-UP connected to the terminal device, the third network device is a distributed unit node DU connected to the terminal device, and the fourth network device is a 5GC node.

According to the data volume reporting method provided in this embodiment of this application, the CU-CP reports, to the 5GC node, a volume of data that is of the multi-connectivity terminal device and that passes through each DU, so that the 5GC can obtain the volume of the data that is of the terminal device and that passes through each DU at a network slice granularity, to provide a basis for network traffic charging of the terminal device.

According to a ninth aspect, an embodiment of this application provides a multi-connectivity data volume reporting method, and the method includes: forming, by a second network device, a second data volume report, where the second data volume report is used to indicate a volume of data that is of a terminal device and that passes through the second network device, and the second data volume report includes QoS flow identifiers QFIs of one or more quality of service QoS flows, identifiers of protocol data unit PDU sessions to which the one or more QoS flows belong, and data volumes of the one or more QoS flows; and sending, by the second network device, the second data volume report to a first network device.

In a possible implementation, the second data volume report further includes at least one of identifiers of data radio bearers DRBs to which the one or more QoS flows are mapped, bearer types of the one or more QoS flows, and identifiers of network slices to which the one or more QoS flows belong.

In a possible implementation, the data volumes of the one or more QoS flows are volumes of data that is of the terminal device and that passes through a secondary cell group SCG bearer and/or a split bearer of the second network device.

In a possible implementation, the first network device is a master node connected to the terminal device, and the second network device is a secondary node connected to the terminal device.

According to the data volume reporting method provided in this embodiment of this application, the SN reports, to the MN, a volume of data that is of the multi-connectivity terminal device and that passes through the SN, so that the MN can obtain the volume of the data that is of the terminal device and that passes through the SN at a QoS flow granularity.

According to a tenth aspect, an embodiment of this application provides a multi-connectivity data volume reporting method, and the method includes: forming, by a second network device, a second data volume report, where the second data volume report is used to indicate a volume of data that is of a terminal device and that passes through the second network device, the second data volume report includes data volume information of one or more quality of service QoS flow groups, and data volume information of one QoS flow group includes QoS flow identifiers QFIs of one or more QoS flows in the QoS flow group, identifiers of protocol data unit PDU sessions to which the one or more QoS flows belong, and a sum of data volumes of all QoS flows in the QoS flow group; and sending, by the second network device, the second data volume report to a first network device.

In a possible implementation, the data volumes of the one or more QoS flows are volumes of data that is of the terminal device and that passes through a secondary cell group SCG bearer and/or a split bearer of the second network device.

In a possible implementation, the first network device is a master node connected to the terminal device, and the second network device is a secondary node connected to the terminal device.

According to the data volume reporting method provided in this embodiment of this application, the SN reports, to the MN, a volume of data that is of the multi-connectivity terminal device and that passes through the SN, so that the MN can obtain the volume of the data that is of the terminal device and that passes through the SN at a QoS flow group granularity.

According to an eleventh aspect, an embodiment of this application provides a multi-connectivity data volume reporting method, and the method includes: forming, by a second network device, a second data volume report, where the second data volume report is used to indicate a volume of data that is of a terminal device and that passes through the second network device, the second data volume report includes identifiers of one or more protocol data unit PDU sessions and data volume information of the one or more PDU sessions and data volume information of one PDU session includes QoS flow identifiers QFIs of one or more quality of service QoS flows of the PDU session and a sum of data volumes of all of the one or more QoS flows; and sending, by the second network device, the second data volume report to a first network device.

In a possible implementation, the data volumes of the one or more QoS flows are volumes of data that is of the terminal device and that passes through a secondary cell group SCG bearer and/or a split bearer of the second network device.

In a possible implementation, the first network device is a master node connected to the terminal device, and the second network device is a secondary node connected to the terminal device.

According to the data volume reporting method provided in this embodiment of this application, the SN reports, to the MN, a volume of data that is of the multi-connectivity terminal device and that passes through the SN, so that the MN can obtain the volume of the data that is of the terminal device and that passes through the SN at a PDU session granularity.

According to a twelfth aspect, an embodiment of this application provides a multi-connectivity data volume reporting method, and the method includes: forming, by a second network device, a second data volume report, where the second data volume report is used to indicate a volume of data that is of a terminal device and that passes through the second network device, the second data volume report includes identifiers of one or more network slices and data volume information of the one or more network slices, and data volume information of one network slice includes QoS flow identifiers QFIs of one or more quality of service QoS flows of the network slice, identifiers of protocol data unit PDU sessions to which the one or more QoS flows belong, and a sum of data volumes of all of the one or more QoS flows; and sending, by the second network device, the second data volume report to a first network device.

In a possible implementation, the data volumes of the one or more QoS flows are volumes of data that is of the terminal device and that passes through a secondary cell group SCG bearer and/or a split bearer of the second network device.

In a possible implementation, the first network device is a master node connected to the terminal device, and the second network device is a secondary node connected to the terminal device.

According to the data volume reporting method provided in this embodiment of this application, the SN reports, to the MN, a volume of data that is of the multi-connectivity terminal device and that passes through the SN, so that the MN can obtain the volume of the data that is of the terminal device and that passes through the SN at a network slice granularity.

According to a thirteenth aspect, an embodiment of this application provides a multi-connectivity data volume reporting method, and the method includes: forming, by a second network device, a second data volume report, where the second data volume report is used to indicate volumes of data that is of a terminal device and that passes through one or more third network devices connected to the second network device, the second data volume report includes data volume information of the one or more third network devices, and data volume information of one third network device includes QoS flow identifiers QFIs of one or more quality of service QoS flows that are of the terminal device and that pass through the third network device, identifiers of protocol data unit PDU sessions to which the one or more QoS flows belong, and data volumes of the one or more QoS flows; and sending, by the second network device, the second data volume report to a first network device.

In a possible implementation, the second data volume report further includes at least one of identifiers of the one or more third network devices, identifiers of data radio bearers DRBs to which the one or more QoS flows are mapped, and identifiers of network slices to which the one or more QoS flows belong.

In a possible implementation, the first network device is a central unit-control plane function node CU-CP connected to the terminal device, the second network device is a central unit-user plane function node CU-UP connected to the terminal device, and the third network device is a distributed unit node DU connected to the terminal device.

According to the data volume reporting method provided in this embodiment of this application, the CU-UP reports, to the CU-CP, a volume of data that is of the multi-connectivity terminal device and that passes through each DU connected to the CU-UP, so that the CU-CP can obtain the volume of the data that is of the terminal device and that passes through each DU at a QoS flow granularity.

According to a fourteenth aspect, an embodiment of this application provides a multi-connectivity data volume reporting method, and the method includes: forming, by a second network device, a second data volume report, where the second data volume report is used to indicate volumes of data that is of a terminal device and that passes through one or more third network devices connected to the second network device, the second data volume report includes data volume information of the one or more third network devices, data volume information of one third network device includes data volume information of one or more quality of service QoS flow groups that are of the terminal device and that pass through the third network device, and data volume information of one QoS flow group includes QoS flow identifiers QFIs of one or more QoS flows in the QoS flow group, identifiers of PDU sessions to which the one or more QoS flows belong, and a sum of data volumes of all of the one or more QoS flows; and sending, by the second network device, the second data volume report to a first network device.

In a possible implementation, the second data volume report further includes at least one of identifiers of the one or more third network devices, identifiers of data radio bearers DRBs to which the one or more QoS flows are mapped, and identifiers of network slices to which the one or more QoS flows belong.

In a possible implementation, the first network device is a central unit-control plane function node CU-CP connected to the terminal device, the second network device is a central unit-user plane function node CU-UP connected to the terminal device, and the third network device is a distributed unit node DU connected to the terminal device.

According to the data volume reporting method provided in this embodiment of this application, the CU-UP reports, to the CU-CP, a volume of data that is of the multi-connectivity terminal device and that passes through each DU connected to the CU-UP, so that the CU-CP can obtain the volume of the data that is of the terminal device and that passes through each DU at a QoS flow group granularity.

According to a fifteenth aspect, an embodiment of this application provides a multi-connectivity data volume reporting method, and the method includes: forming, by a second network device, a second data volume report, where the second data volume report is used to indicate volumes of data that is of a terminal device and that passes through one or more third network devices connected to the second network device, the second data volume report includes data volume information of the one or more third network devices, data volume information of one third network device includes identifiers of one or more protocol data unit PDU sessions that are of the terminal device and that pass through the third network device and data volume information of the one or more PDU sessions, and data volume information of one PDU session includes QoS flow identifiers QFIs of one or more quality of service QoS flows of the PDU session and a sum of data volumes of all of the one or more QoS flows; and sending, by the second network device, the second data volume report to a first network device.

In a possible implementation, the second data volume report further includes at least one of identifiers of the one or more third network devices, identifiers of data radio bearers DRBs to which the one or more QoS flows are mapped, and identifiers of network slices to which the one or more QoS flows belong.

In a possible implementation, the first network device is a central unit-control plane function node CU-CP connected to the terminal device, the second network device is a central unit-user plane function node CU-UP connected to the terminal device, and the third network device is a distributed unit node DU connected to the terminal device.

According to the data volume reporting method provided in this embodiment of this application, the CU-UP reports, to the CU-CP, a volume of data that is of the multi-connectivity terminal device and that passes through each DU connected to the CU-UP, so that the CU-CP can obtain the volume of the data that is of the terminal device and that passes through each DU at a PDU session granularity.

According to a sixteenth aspect, an embodiment of this application provides a multi-connectivity data volume reporting method, and the method includes: forming, by a second network device, a second data volume report, where the second data volume report is used to indicate volumes of data that is of a terminal device and that passes through one or more third network devices connected to the second network device, the second data volume report includes data volume information of the one or more third network devices, data volume information of one third network device includes identifiers of one or more network slices that are of the terminal device and that pass through the third network device and data volume information of the one or more network slices, and data volume information of one network slice includes QoS flow identifiers QFIs of one or more quality of service QoS flows of the network slice, identifiers of protocol data unit PDU sessions to which the one or more QoS flows belong, and a sum of data volumes of all of the one or more QoS flows; and sending, by the second network device, the second data volume report to a first network device.

In a possible implementation, the second data volume report further includes at least one of identifiers of the one or more third network devices, identifiers of data radio bearers DRBs to which the one or more QoS flows are mapped, and an identifier of the network slice to which the one or more QoS flows belong.

In a possible implementation, the first network device is a central unit-control plane function node CU-CP connected to the terminal device, the second network device is a central unit-user plane function node CU-UP connected to the terminal device, and the third network device is a distributed unit node DU connected to the terminal device.

According to the data volume reporting method provided in this embodiment of this application, the CU-UP reports, to the CU-CP, a volume of data. that is of the multi-connectivity terminal device and that passes through each DU connected to the CU-UP, so that the CU-CP can obtain the volume of the data that is of the terminal device and that passes through each DU at a network slice granularity.

According to a seventeenth aspect, a network device is provided, configured to perform the method in any one of the first aspect and the possible implementations of the first aspect, any one of the second aspect and the possible implementations of the second aspect, any one of the third aspect and the possible implementations of the third aspect, any one of the fourth aspect and the possible implementations of the fourth aspect, any one of the fifth aspect and the possible implementations of the fifth aspect, any one of the sixth aspect and the possible implementations of the sixth aspect, any one of the seventh aspect and the possible implementations of the seventh aspect, or any one of the eighth aspect and the possible implementations of the eighth aspect. Specifically, the network device may include a unit for perforating the method in any one of the first aspect and the possible implementations of the first aspect, any one of the second aspect and the possible implementations of the second aspect, any one of the third aspect and the possible implementations of the third aspect, any one of the fourth aspect and the possible implementations of the fourth aspect, any one of the fifth aspect and the possible implementations of the fifth aspect, any one of the sixth aspect and the possible implementations of the sixth aspect, any one of the seventh aspect and the possible implementations of the seventh aspect, or any one of the eighth aspect and the possible implementations of the eighth aspect.

According to an eighteenth aspect, another network device is provided, configured to perform the method in any one of the ninth aspect and the possible implementations of the ninth aspect, any one of the tenth aspect and the possible implementations of the tenth aspect, any one of the eleventh aspect and the possible implementations of the eleventh aspect, any one of the twelfth aspect and the possible implementations of the twelfth aspect, any one of the thirteenth aspect and the possible implementations of the thirteenth aspect, any one of the fourteenth aspect and the possible implementations of the fourteenth aspect, any one of the fifteenth aspect and the possible implementations of the fifteenth aspect, or any one of the sixteenth aspect and the possible implementations of the sixteenth aspect. Specifically, the network device may include a unit for performing the method in any one of the ninth aspect and the possible implementations of the ninth aspect, any one of the tenth aspect and the possible implementations of the tenth aspect, any one of the eleventh aspect and the possible implementations of the eleventh aspect, any one of the twelfth aspect and the possible implementations of the twelfth aspect, any one of the thirteenth aspect and the possible implementations of the thirteenth aspect, any one of the fourteenth aspect and the possible implementations of the fourteenth aspect, any one of the fifteenth aspect and the possible implementations of the fifteenth aspect, or any one of the sixteenth aspect and the possible implementations of the sixteenth aspect.

According to a nineteenth aspect, another network device is provided, including a memory and a processor, where the memory is configured to store a computer program, and the processor is configured to invoke the computer program from the memory and run the computer program, so that the network device performs the method in any one of the first aspect and the possible implementations of the first aspect, any one of the second aspect and the possible implementations of the second aspect, any one of the third aspect and the possible implementations of the third aspect, any one of the fourth aspect and the possible implementations of the fourth aspect, any one of the fifth aspect and the possible implementations of the fifth aspect, any one of the sixth aspect and the possible implementations of the sixth aspect, any one of the seventh aspect and the possible implementations of the seventh aspect, or any one of the eighth aspect and the possible implementations of the eighth aspect.

According to a twentieth aspect, another network device is provided, including a memory and a processor, where the memory is configured to store a computer program, and the processor is configured to invoke the computer program from the memory and run the computer program, so that the network device performs the method in any one of the ninth aspect and the possible implementations of the ninth aspect, any one of the tenth aspect and the possible implementations of the tenth aspect, any one of the eleventh aspect and the possible implementations of the eleventh aspect, any one of the twelfth aspect and the possible implementations of the twelfth aspect, any one of the thirteenth aspect and the possible implementations of the thirteenth aspect, any one of the fourteenth aspect and the possible implementations of the fourteenth aspect, any one of the fifteenth aspect and the possible implementations of the fifteenth aspect, or any one of the sixteenth aspect and the possible implementations of the sixteenth aspect.

According to a twenty-first aspect, an embodiment of the present invention provides a communications system, including a first network device and a second network device, where the first network device is the first network device in any one of the first aspect to the eighth aspect, and the second network device is the second network device in any one of the ninth aspect to the sixteenth aspect.

According to a twenty-second aspect, a computer program product is provided, and the computer program product includes computer program code. When the computer program code is run by a communications unit and a processing unit or a transceiver and a processor of a first network device (for example, a network slice management function), the first network device is enabled to perform the method in any one of the first aspect and the possible implementations of the first aspect, any one of the second aspect and the possible implementations of the second aspect, any one of the third aspect and the possible implementations of the third aspect, any one of the fourth aspect and the possible implementations of the fourth aspect, any one of the fifth aspect and the possible implementations of the fifth aspect, any one of the sixth aspect and the possible implementations of the sixth aspect, any one of the seventh aspect and the possible implementations of the seventh aspect, or any one of the eighth aspect and the possible implementations of the eighth aspect.

According to a twenty-third aspect, another computer program product is provided, and the computer program product includes computer program code. When the computer program code is run by a communications unit and a processing unit or a transceiver and a processor of a second network device (for example, a network slice subnet management function), the second network device is enabled to perform the method in any one of the ninth aspect and the possible implementations of the ninth aspect, any one of the tenth aspect and the possible implementations of the tenth aspect, any one of the eleventh aspect and the possible implementations of the eleventh aspect, any one of the twelfth aspect and the possible implementations of the twelfth aspect, any one of the thirteenth aspect and the possible implementations of the thirteenth aspect, any one of the fourteenth aspect and the possible implementations of the fourteenth aspect, any one of the fifteenth aspect and the possible implementations of the fifteenth aspect, or any one of the sixteenth aspect and the possible implementations of the sixteenth aspect.

According to a twenty-fourth aspect, a computer readable storage medium is provided, configured to store a computer software program instruction used by the foregoing first network device. When the program instruction is executed by the first network device, the first network device is enabled to perform the method in any one of the first aspect and the possible implementations of the first aspect, any one of the second aspect and the possible implementations of the second aspect, any one of the third aspect and the possible implementations of the third aspect, any one of the fourth aspect and the possible implementations of the fourth aspect, any one of the fifth aspect and the possible implementations of the fifth aspect, any one of the sixth aspect and the possible implementations of the sixth aspect, any one of the seventh aspect and the possible implementations of the seventh aspect, or any one of the eighth aspect and the possible implementations of the eighth aspect.

According to a twenty-fifth aspect, a computer readable storage medium is provided, configured to store a computer software program instruction used by the foregoing second network device. When the program instruction is executed by the second network device, the second network device is enabled to perform the method in any one of the ninth aspect and the possible implementations of the ninth aspect, any one of the tenth aspect and the possible implementations of the tenth aspect, any one of the eleventh aspect and the possible implementations of the eleventh aspect, any one of the twelfth aspect and the possible implementations of the twelfth aspect, any one of the thirteenth aspect and the possible implementations of the thirteenth aspect, any one of the fourteenth aspect and the possible implementations of the fourteenth aspect, any one of the fifteenth aspect and the possible implementations of the fifteenth aspect, or any one of the sixteenth aspect and the possible implementations of the sixteenth aspect.

These aspects and other aspects of the present invention will be simpler and easier to understand in descriptions of the following (a plurality of) embodiments.

BRIEF DESCRIPTION OF DRAWINGS

The following briefly describes accompanying drawings used for describing embodiments of this application or the prior art.

DESCRIPTION OF EMBODIMENTS

Figure 1:
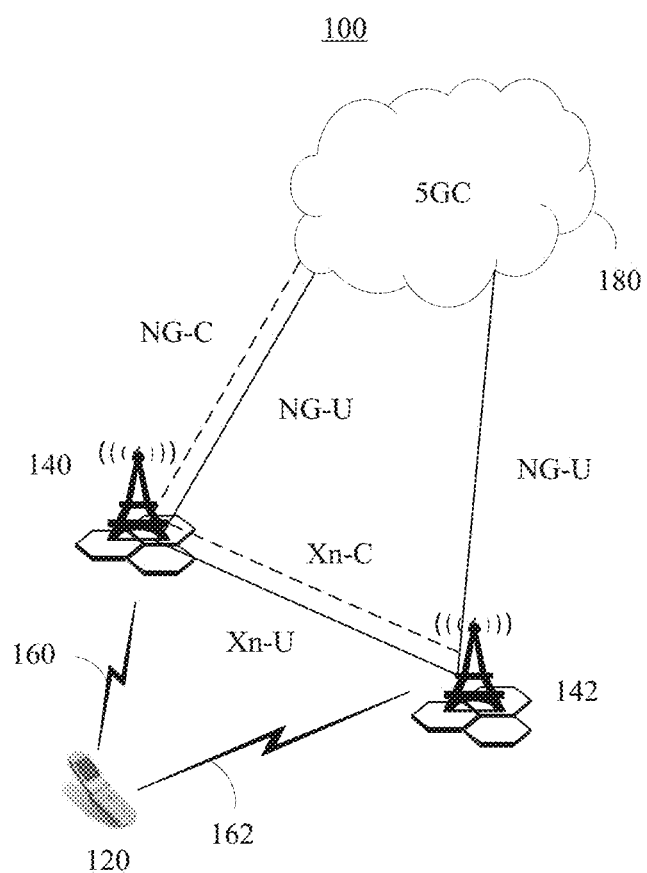
FIG. 1 is a schematic diagram of a dual-connectivity communications system according to an embodiment of this application.

The following describes the embodiments of this application with reference to the accompanying drawings in the embodiments of this application.

In this application, the word "example" is used to represent giving an example, an illustration, or a description. Any embodiment described as an "example" in this application should not be explained as being more preferred or having more advantages than another embodiment. To enable any person skilled in the art to implement and use the present invention, the following description is provided. In the following description, details are set forth for the purpose of explanation. It should be understood that a person of ordinary skill in the art may learn that the present invention can be implemented without using these specific details. In another instance, a well-known structure and a well-known process are not described in detail, to avoid obscure description of the present invention caused by unnecessary details. Therefore, the present invention is not limited to the shown embodiments, but is consistent with a maximum scope of principles and features that are disclosed in this application.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way is interchangeable in proper circumstances so that the embodiments of this application described herein can be implemented in an order other than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Specific embodiments are used below to describe in detail the technical solutions of the present invention. The following several specific embodiments may be combined with each other, and a same or similar concept or process may not be described repeatedly in some embodiments.

In order to effectively support a variety of application types such as an access capability with high-rate experience and wide bandwidth, information exchange with a low latency and high reliability, and massive machine type communication with low costs, a QoS flow based management framework is implemented for a service in a 5G network as a key feature of 5G. A QoS flow is a finest granularity for managing a communication service of a terminal device in the 5G network, that is, same packet forwarding processing (for example, a scheduling policy, a queuing management policy, and a rate adjustment policy) is performed on data in a QoS flow When the terminal device establishes service communication with the network, the 5G network allocates a QoS flow identifier (QFI) to a QoS flow of the terminal device to indicate the QoS flow, and same QoS processing is performed on packet data with a same QFI.

For data transmission between a 5GC and an access network, the communication service of the terminal device is processed in the network on a QoS flow basis. A terminal device can simultaneously support services of one or more network slices. A service of one network slice may include one or more protocol data unit (PDU) sessions, and one PDU session may include one or more QoS flows. In addition, for data transmission over an air interface between the access network and the terminal device, an access network node or the terminal device maps one or more QoS flows to one data radio bearer (DRB) at a service data adaptation protocol (SDAP) layer to implement transmission to a peer end. It should be noted that in an LTE system, a protocol stack for processing user plane data in an eNB and a terminal device includes a packet data convergence protocol (PDCP) layer, a radio link control (RLC) layer, a media access control (MAC) layer, and a physical (PHY) layer, where the PDCP layer is responsible for processing data carried on a DRB. In a 5G system, a protocol stack for processing user plane data in an access network node and a terminal device further includes an SDAP layer, where the SDAP layer is above the PDCP layer and is responsible for mapping and/or demapping between a QoS flow and a DRB. For data transmission over an air interface, one PDU session for communication by a terminal device may include one or more DRBs, and one DRB includes one or more QoS flows.

In the 5G system, a terminal device may be connected to two access network nodes through dual connectivity or to three or more access network nodes through more connectivity. For ease of description, the foregoing two manners are collectively referred to as multi-connectivity in this application. FIG. 1 is a schematic diagram of a dual-connectivity communications system 100 according to an embodiment of this application. A terminal device 120 separately performs wireless communication with an access network node 140 and an access network node 142 on a radio link 160 and a radio link 162. The access network node 140 is referred to as a master node (MN), and the access network node 142 is referred to as a secondary node (SN). The master node 140 may be connected to a 5GC 180 through a control plane interface NG-C and a user plane interface NG-U, the secondary node 142 may be connected to the 5GC 180 through a user plane interface NG-U, and the master node 140 may be connected to the secondary node 142 through a control plane interface Xn-C and a user plane interface Xn-U. For example, the master node 140 is connected to an access and mobility management function (AMF) node in the 5GC 180 through the NG-C interface, and the master node 140 and the secondary node 142 are connected to a user plane function (UPF) node in the 5GC 180 through the NG-U interfaces. It should be noted that the master node 120 and the secondary node 122 may be new radio (NR) access nodes gNBs or evolved eNB nodes ng-eNBs. It should be understood that FIG. 1 shows only a dual-connectivity scenario. For a multi-connectivity scenario, one MN and a plurality of SNs may simultaneously communicate with one terminal device.

A function of the MN and a function of each of the plurality of SNs are respectively similar to a function of the master node 140 and a function the secondary node 142, and details are not described herein.

Figure 2:
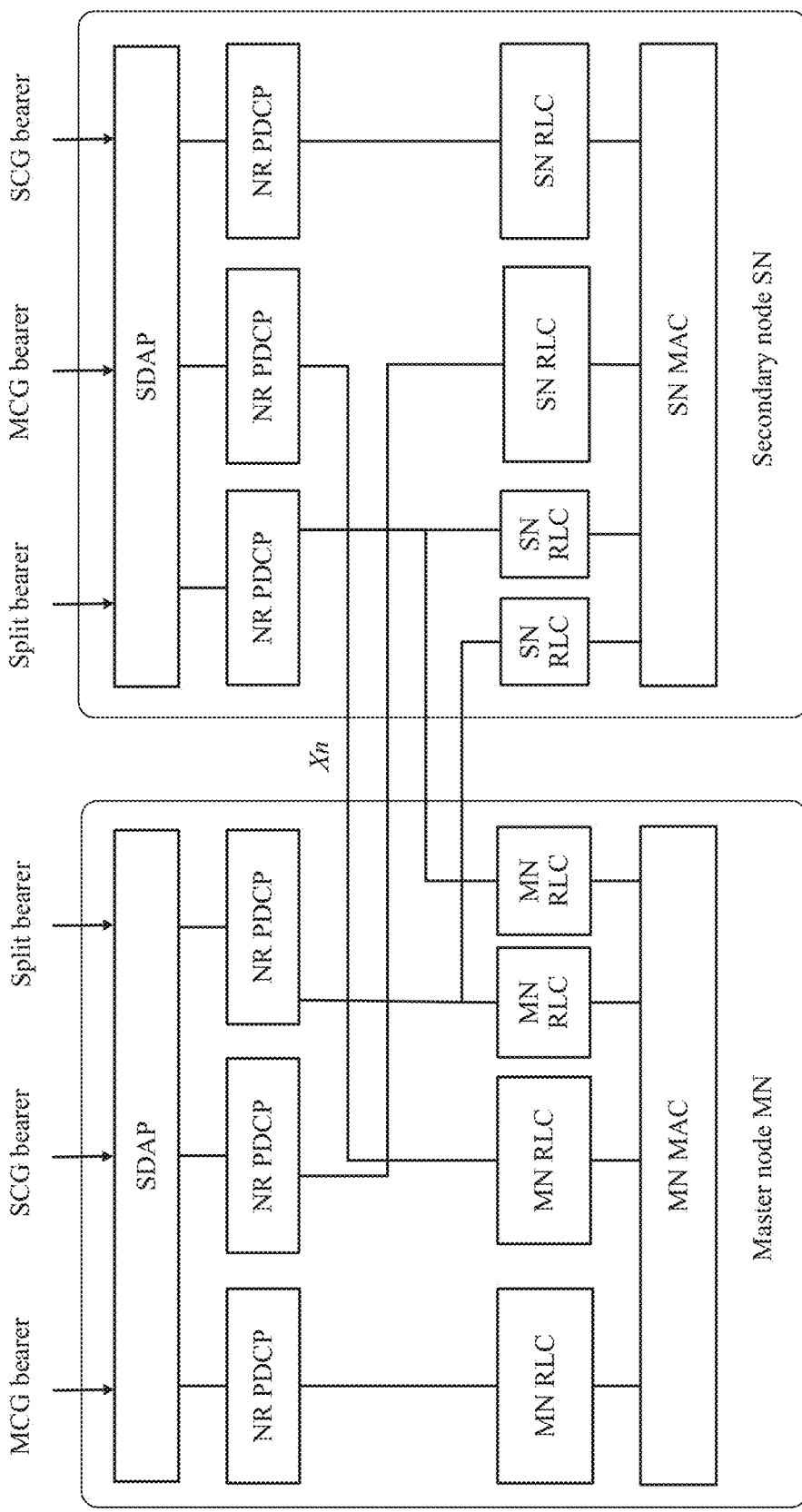
FIG. 2 is a protocol stack architecture of a dual-connectivity access network node according to an embodiment of this application.

FIG. 2 shows a protocol stack architecture of a dual-connectivity access network node according to an embodiment of this application. A terminal device performs dual-connectivity communication with two access network nodes based on types of data bearers. The types of the bearers are determined when the terminal device establishes dual-connectivity communication with a network, and may be modified in a dual-connectivity communication process. Based on an access network node on which a PDCP layer for processing a data bearer of a user plane is located, bearers may be classified into an MN terminated bearer and an SN terminated bearer. For example, the left part shown in FIG. 2 corresponds to the MN terminated bearer, and a PDCP layer for processing a user plane data bearer of the terminal device on an access network side is located in the MN. The right part shown in FIG. 2 corresponds to the SN terminated bearer, and the PDCP layer for processing the user plane data bearer of the terminal device on the access network side is located in the SN. The MN terminated bearer and the SN terminated bearer may be further classified into a master cell group (MCG) bearer, a secondary cell group (SCG) bearer, and a split bearer based on an access network node on Which an RLC layer for processing the user plane data bearer is located. In the MN terminated bearer type, for an MCG bearer, user plane data of the bearer is processed by using a PDCP layer, an RLC layer, and a MAC layer of the MN, and is transmitted by using a PHY layer of the MN. For an SCG bearer, user plane data of the bearer is processed by using the PDCP layer of the MN and an RLC layer and a MAC layer of the SN, and is transmitted by using a PHY layer of the SN. For a split bearer, user plane data of the bearer is processed by using the PDCP layer of the MN, a part of data of the bearer is processed by using the RLC layer and the MAC layer of the MN, and a part of data is processed by using the RLC layer and the MAC layer of the SN, and processed data is separately transmitted by using the PHY layer of the MN and the PHY layer of the SN. Similarly, in the SN terminated bearer type, for an SCG bearer, user plane data of the bearer is processed by using a PDCP layer, the RLC layer, and the MAC layer of the SN, and is transmitted by using the PRY layer of the SN. For an MCG bearer, user plane data of the bearer is processed by using the PDCP layer of the SN and the RLC layer and the MAC layer of the MN, and is transmitted by using the PHY layer of the MN. For a split bearer, user plane data of the bearer is processed by using the PDCP layer of the SN, a part of data of the bearer is processed by using the RLC layer and the MAC layer of the SN, and a part of data is processed by using the RLC layer and the MAC layer of the MN, and processed data is separately transmitted by using the PHY layer of the SN and the PITY layer of the MN.

In a conventional LTE system, for reporting a data volume of service data of a terminal device in a dual-connectivity scenario, the MN sends, to an EPC, a data volume of a service that is of the terminal device and that passes through the SN. The data volume of the service that is of the terminal device and that passes through the SN is reported by using an EPS bearer as a granularity. A data gateway in the EPC has information about a total data volume of the service data of the terminal device, and may obtain, based on the data volume of the service passing through the SN, a data volume of the service passing through the MN. Therefore, data volumes of the service passing through different access network nodes can be effectively and accurately charged. For example, the MN counts, in a specific time period, a data volume of one EPS bearer that is of the terminal device and that passes through the SN, and reports the data volume to the EPC. The inventor finds that because the EPS bearer is no longer applicable to QoS management of a 5G system, a new method needs to be used to report the data volume of the service that is of the terminal device and that passes through the SN. Therefore, an embodiment of this application provides a technical solution for reporting a data volume in a mufti-connectivity scenario.

Figure 3:
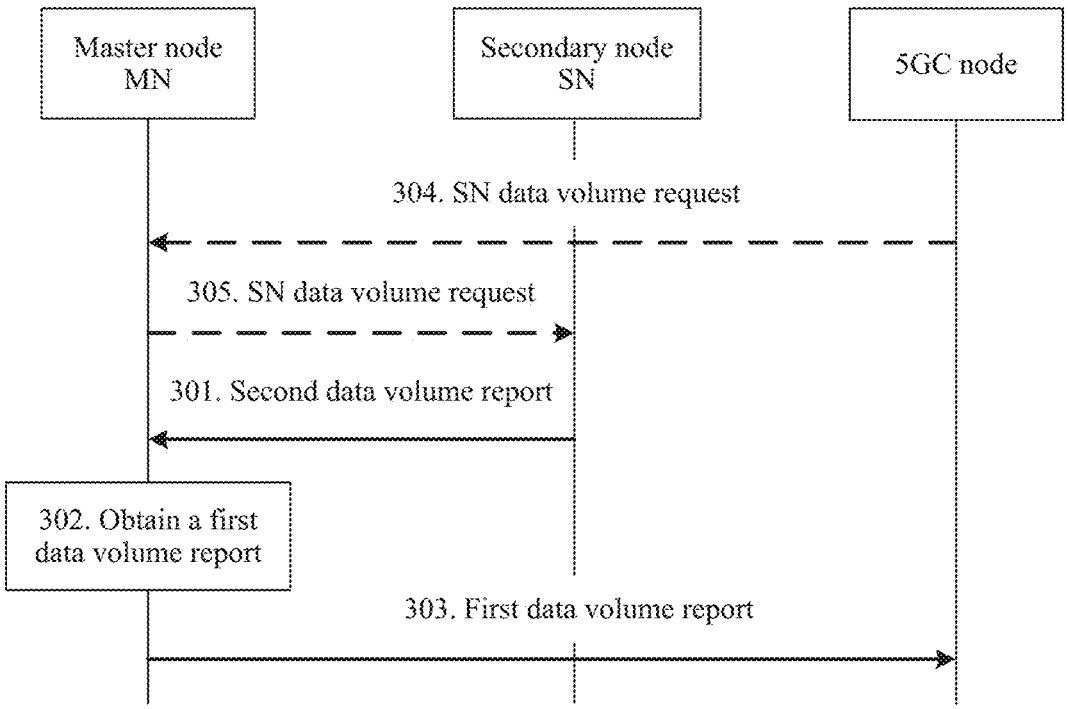
FIG. 3 is a schematic flowchart of a data volume reporting method in a multi-connectivity scenario according to an embodiment of this application.

FIG. 3 is a schematic flowchart of a data volume reporting method 300 in a multi-connectivity scenario according to an embodiment of this application. The method 300 may be applied to interaction between the master node 140, the secondary node 142, and the 5GC 180 shown in FIG. 1 in an SN terminated bearer type. The procedure in FIG. 3 includes the following steps.

301. An SN sends a second data volume report to an MN.

In this step, the SN sends, to the MN, the second data volume report of a volume of data that is of a terminal device and that passes through the SN. The second data volume report includes QFIs of one or more QoS flows passing through the SN, identifiers of PDU sessions to which the one or more QoS flows belong, and data volumes of the one or more QoS flows. It should be understood that the data volumes of the one or more QoS flows may be data volumes of all of the one or more QoS flows passing through the SN, or may be a sum of data volumes of all of the one or more QoS flows passing through the SN. Optionally, the second data volume report further includes at least one of identifiers of DRBs to which the one or more QoS flows passing through the SN are mapped, bearer types of the one or more QoS flows, and identifiers of network slices to which the one or more QoS flows belong. In this embodiment of this application, because a PDCP layer for processing a user plane data bearer of the terminal device is located in the SN, the SN may count a data volume of service data that is of an SCG bearer and/or a split bearer of the terminal device and that passes through the SN, and send the data volume to the MN.

For example, the terminal device performs multi-connectivity communication of an SN terminated bearer type with a plurality of network nodes, including an SN terminated SCG bearer and/or an SN terminated split bearer. Service data that is of the SN terminated SCG bearer and/or the SN terminated split bearer of the terminal device and that passes through the SN includes data of a first PDU session and data of a second PDU session. The first PDU session passing through the SN includes a first QoS flow a second QoS flow, and a third QoS flow, the first QoS flow and the second QoS flow are mapped to a first DRB, the third QoS flow is mapped to a second DRB, and the first QoS flow, the second QoS flow, and the third QoS flow belong to the SN terminated SCG bearer type. The second PDU session passing through the SN includes a fourth QoS flow and a fifth QoS flow, the fourth QoS flow and the fifth QoS flow are mapped to a third DRB, and the fourth QoS flow and the fifth QoS flow belong to the SN terminated split bearer type. The first PDU session belongs to a first network slice, and the second PDU session belongs to a second network slice. It should be understood that the first PDU session and the second PDU session may further separately include another QoS flow that does not pass through the SN. The first network slice and the second network slice may further separately include another PDU session that does not pass through the SN. In this example, the second data volume report sent by the SN to the MN includes an identifier of the first PDU session, a QFI of the first QoS flow, and a data volume of the first QoS flow passing through the SN; a QFI of the second QoS flow and a data volume of the second QoS flow passing through the SN; a QFI of the third QoS flow and a data volume of the third QoS flow passing through the SN; an identifier of the second PDU session, a QFI of the fourth QoS flow, and a data volume of the fourth QoS flow passing through the SN; and a QFI of the fifth QoS flow and a data volume of the fifth QoS flow passing through the SN. Optionally, the second data volume report further includes identifiers of the first DRB to the third DRB, the SCG bearer type, the split bearer type, an identifier of the first network slice, and an identifier of the second network slice. It should be noted that data of one QoS flow passing through the SN may be all data of the QoS flow, or may be a part of data of the QoS flow. For example, for the SN terminated SCG bearer, all data of one QoS flow passes through the SN, and a data volume of the QoS flow passing through the SN is a data volume of all the data of the QoS flow in this case. For the SN terminated split bearer, a part of data of one QoS flow passes through the SN and another part of data passes through the MN, and a data volume of the QoS flow passing through the SN is a data volume of the part of data that is of the QoS flow and that passes through the SN.

For example, Table 1 shows information elements (IE) of the second data volume report sent by the SN to the MN.

TABLE 1

| Second data volume report sent by the SN to the MN |
| --- |
| IE/Group Name |
| > PDU session ID |
| > S-NSSAI |
| >> Bearer list |
| >>> CHOICE Bearer Option |
| >>>> SCG bearer |
| >>>>> Bearer ID |
| >>>>> Data volume per QoS flow |
| >>>> Split bearer |
| >>>>> Bearer ID |
| >>>>> Data volume per QoS flow |
| . . . |

The MU session ID indicates identifiers that are of PDU sessions to which one or more QoS flows belong and that are sent by the SN to the MN. The single network slice selection assistance information (S-NSSAI) indicates identifiers of network slices to which the one or more QoS flows belong. The bearer list is a DRB identifier list, and is used to indicate identifiers of one or more DRBs to which the one or more QoS flows are mapped. The CHOICE Bearer Option is used to indicate a bearer type, such as the SN terminated SCG bearer or the SN terminated split bearer. The bearer ID indicates a DRB identifier. The data volume per QoS flow is used to indicate a data volume of one QoS flow that is of the terminal device and that passes through the SN, including a QFI of the QoS flow, a start counting time Starttimestamp and an end counting time Endtimestamp at which the SN counts a volume of data passing through the SN, an uplink data volume UsagecountUL of the QoS flow passing through the SN, and a downlink data volume UsagecountDL of the QoS flow passing through the SN. It should be understood that when the second data volume report includes data volumes of a plurality of PDU sessions passing through the SN, the second data volume report includes a plurality of information element groups shown in Table 1, that is, includes identifiers of the plurality of PDU sessions and a data volume of each PDU session passing through the SN. In addition, if the SN counts, at a same start counting time and a same end counting time, data volumes of a plurality of QoS flows passing through the SN, each data volume per QoS flow entry does not need to include a respective start counting time IE or a respective end counting time IE, but places the start counting time IE and the end counting time IE outside the data volume per QoS flow entry as common parameters for counting a data volume of each QoS flow.

302. The MN obtains a first data volume report.

In this step, the MN obtains the first data volume report based on the second data volume report that is reported by the SN and that is received in step 301, IEs included in the first data volume report may be partially or totally the same as IEs included in the second data volume report.

In a possible implementation, the first data volume report, includes QFIs of one or more QoS flows that are of each of one or more PDU sessions of the terminal device and that pass through the SN, identifiers of PDU sessions to which the one or more QoS flows belong, and data volumes of the one or more QoS flows. Optionally, the first data volume report further includes bearer types of the one or more QoS flows passing through the SN and/or identifiers of network slices to which the one or more QoS flows belong. Corresponding to the foregoing example, the first data volume report, includes an identifier of the first PM session, a QFI of the first QoS flow, and a data volume of the first QoS flow passing through the SN; a QFI of the second QoS flow and a data volume of the second QoS flow passing through the SN; a QFI of the third QoS flow and a data volume of the third QoS flow passing through the SN; an identifier of the second PM session, a QFI of the fourth QoS flow, and a data volume of the fourth QoS flow passing through the SN; and a QFI of the fifth QoS flow and a data volume of the fifth QoS flow passing through the SN. Optionally, the first data volume report further includes the SCG bearer type, the split bearer type, an identifier of the first network slice, and an identifier of the second network slice.

In another possible implementation, the MN sums up data volumes of all of one or more QoS flows in a same QoS flow group in the second data volume report reported by the SN, to form the first data volume report. One QoS flow group includes one or more QoS flows of one PDU session. A network classifies different QoS flows into different QoS flow groups according to a specific criterion, for example, a 5GC-based charging policy, a DRB-based granularity, or an indication sent by a 5GC, to classify one or more QoS flows into one QoS flow group. In this implementation, the first data volume report includes data volume information of one or more QoS flow groups that are of each of one or more PDU sessions of the terminal device and that pass through the SN. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the SN). Optionally, data volume information of one QoS flow group further includes bearer types of one or more QoS flows in the QoS flow group and/or identifiers of network slices to which the one or more QoS flows belong. Corresponding to the foregoing example, if the first QoS flow and the second QoS flow belong to a first QoS flow group, the third QoS flow belongs to a second QoS flow group, and the fourth QoS flow and the fifth QoS flow belong to a third QoS flow group, the first data volume report includes an identifier of the first PDU session, a QFI of the first QoS flow, a QFI of the second QoS flow, and a sum of data volumes of the first QoS flow and the second QoS flow passing through the SN (that is, a data volume of the first QoS flow group passing through the SN); a QFI of the third QoS flow and a data volume of the third QoS flow passing through the SN (that is, a data volume of the second QoS flow group passing through the SN); and an identifier of the second PM session, a QFI of the fourth QoS flow, a QFI of the fifth QoS flow, and a sum of data volumes of the fourth QoS flow and the fifth QoS flow passing through the SN (that is, a data volume of the third QoS flow group passing through the SN). Optionally, the first data volume report further includes the SCG bearer type, the split bearer type, an identifier of the first network slice, and an identifier of the second network slice.

In still another possible implementation, the MN sums up data volumes of all of one or more QoS flows of a same PDU session in the second data volume report reported by the SN, to form the first data volume report. In this implementation, the first data volume report includes identifiers of one or more PDU sessions that are of the terminal device and that pass through the SN and data volume information of the one or more PDU sessions. Data volume information of one PDU session includes a sum of data volumes of all of one or more QoS flows of the PDU session (that is, a data volume of the PDU session passing through the SN). Optionally, data volume information of one PDU session further includes at least one of QFIs of one or more QoS flows of the PDU session, bearer types of the one or more QoS flows, and identifiers of network slices to which the one or more QoS flows belong. Corresponding to the foregoing example, the first data volume report includes an identifier of the first PDU session and a sum of data volumes of the first QoS flow to the third QoS flow passing through the SN (that is, a data volume of the first PDU session passing through the SN); and an identifier of the second PDU session and a sum of data volumes of the fourth QoS flow and the fifth QoS flow passing through the SN (that is, a data volume of the second PDU session passing through the SN). Optionally, the first data volume report further includes QFIs of the first QoS flow to the fifth QoS flow, the SCG bearer type, the split bearer type, an identifier of the first network slice, and an identifier of the second network slice.

In yet another possible implementation, the MN sums up data volumes of all of one or more QoS flows of a same network slice in the second data volume report reported by the SN, to form the first data volume report. In this implementation, the first data volume report includes identifiers of one or more network slices that are of the terminal device and that pass through the SN and data volume information of the one or more network slices. Data volume information of one network slice includes a SUM of data volumes of all of one or more QoS flows of the network slice (that is, a data volume of the network slice passing through the SN). Optionally, data volume information of one network slice further includes at least one of QFIs of one or more QoS flows of the network slice, hearer types of the one or more QoS flows, and identifiers of PDU sessions to which the one or more QoS flows belong. Corresponding to the foregoing example, the first data volume report includes an identifier of the first network slice and a sum of data volumes of the first QoS flow to the third QoS flow passing through the SN (that is, a data volume of the first network slice passing through the SN); and an identifier of the second network slice and a sum of data volumes of the fourth QoS flow and the fifth QoS flow passing through the SN (that is, a data volume of the second network slice passing through the SN). Optionally, the first data volume report further includes QFIs of the first QoS flow to the fifth QoS flow, the SCG bearer type, the split bearer type, an identifier of the first PDU session, and an identifier of the second PDU session.

In still yet another possible implementation, the MN sums up data volumes of all of one or more QoS flows that are of the terminal device and that pass through the SN in the second data volume report reported by the SN, to form the first data volume report. In this implementation, the first data volume report includes a sum of the data volumes of all of the one or more QoS flows that are of the terminal device and that pass through the SN (that is, the volume of the data that is of the terminal device and that passes through the SN).

303. The MN sends the first data volume report to a 5GC node.

Optionally, the 5GC node is an AMF.

It should be noted that, if the terminal device implements multi-connectivity by using one MN and a plurality of SNs, a part or all of the plurality of SNs separately send respective second data volume reports to the MN. In this case, the second data volume report further includes an identifier of the SN, such as a base station identifier of the SN and a cell identifier list of the SN. By analogy, the MN forms a first data volume report for each SN that reports a data volume in step 302, and sends one or more first data volume reports to the 5GC node in step 303. It should be understood that if the MN sends a plurality of first data volume reports to the 5GC node, the MN may add the plurality of first data volume reports to one message and send the message to the 5GC node, or may separately send the plurality of first data volume reports to the 5GC node by using a plurality of messages.

Optionally, before the SN sends the second data volume report to the MN, this embodiment of this application further includes steps 304 and 305.

304. The 5GC node sends an SN data volume request to the MN.

In this step, the 5GC node requests the MN to send the volume of the data that is of the terminal device and that passes through the SN. The request may instruct the MN to report the volume of the data that is of the terminal device and that passes through the SN, or may instruct the MN to report, in a specific condition (for example, in an SN modification procedure initiated by the MN, an SN release procedure initiated by the MN, or an SN release procedure initiated by the SN), the volume of the data that is of the terminal device and that passes through the SN, or may instruct the MN to report, in a specific time period, the volume of the data that is of the terminal device and that passes through the SN, or the like. Optionally, the request includes: the MN reports, in a specified manner, the volume of the data that is of the terminal device and that passes through the SN, for example, a data volume of all service data that is of the terminal device and that passes through the SN, data volumes of one or more network slices that are of the terminal device and that pass through the SN, data volumes of one or more PDU sessions that are of the terminal device and that pass through the SN, data volumes of one or more QoS flow groups that are of the terminal device and that pass through the SN, and data volumes of one or more QoS flows that are of the terminal device and that pass through the SN. Further, the request may further include a classification criterion indicating a QoS flow group for SN data volume reporting.

If the terminal device implements multi-connectivity by using a plurality of SNs, the SN data volume request further includes identifiers of one or more SNs.

305. The MN sends the SN data volume request to the SN.

In this step, the MN requests the SN to send the volume of the data that is of the terminal device and that passes through the SN. The request may instruct the SN to report the volume of the data that is of the terminal device and that passes through the SN, or may instruct the SN to report, in a specific condition (for example, in an SN modification procedure initiated by the MN, an SN release procedure initiated by the MN, or an SN release procedure initiated by the SN), the volume of the data that is of the terminal device and that passes through the SN, or may instruct the SN to report, in a specific time period, the volume of the data that is of the terminal device and that passes through the SN. Optionally, the request includes: the SN reports, in a specified manner, the volume of the data that is of the terminal device and that passes through the SN, for example, a data volume of all service data that is of the terminal device and that passes through the SN, data volumes of one or more network slices that are of the terminal device and that pass through the SN, data volumes of one or more PDU sessions that are of the terminal device and that pass through the SN, data volumes of one or more QoS flow groups that are of the terminal device and that pass through the SN, and data volumes of one or more QoS flows that are of the terminal device and that pass through the SN.

If the terminal device implements multi-connectivity by using a plurality of SNs, the MN separately sends the SN data volume request to the plurality of SNs.

Optionally, in step 301, the second data volume report sent by the SN to the MN includes data volume information of one or more QoS flow groups that are of each of one or more PDU sessions of the terminal device and that pass through the SN. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the SN). Optionally, data volume information of one QoS flow group further includes at least one of identifiers of DRBs to which one or more QoS flows in the QoS flow group are mapped, bearer types of the one or more QoS flows, and identifiers of network slices to which the one or more QoS flows belong.

Correspondingly, in step 302, in a possible implementation, the first data volume report includes data volume information of one or more QoS flow groups that are of each of one or more PDU sessions of the terminal device and that pass through the SN. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the SN). Optionally, data volume information of one QoS flow group further includes bearer types of one or more QoS flows in the QoS flow group and/or identifiers of network slices to which the one or more QoS flows belong. In another possible implementation, the MN sums up data volumes of all of one or more QoS flows of a same PDU session in the second data volume report reported by the SN, to form the first data volume report. In this implementation, the first data volume report includes identifiers of one or more PDU sessions that are of the terminal device and that pass through the SN and data volume information of the one or more PDU sessions. Data volume information of one PDU session includes a sum of data volumes of all of one or more QoS flows of the PDU session (that is, a data volume of the PDU session passing through the SN). Optionally, data volume information of one PDU session further includes at least one of QFIs of one or more QoS flows of the PDU session, bearer types of the one or more QoS flows, and identifiers of network slices to which the one or more QoS flows belong. In still another possible implementation, the MN sums up data volumes of all of one or more QoS flows of a same network slice in the second data volume report reported by the SN, to form the first data volume report. In this implementation, the first data volume report includes identifiers of one or more network slices that are of the terminal device and that pass through the SN and data volume information of the one or more network slices. Data volume information of one network slice includes a sum of data volumes of all of one or more QoS flows of the network slice (that is, a data volume of the network slice passing through the SN). Optionally, data volume information of one network slice further includes at least one of QFIs of one or more QoS flows of the network slice, bearer types of the one or more QoS flows, and identifiers of PDU sessions to which the one or more QoS flows belong.

Optionally, in step 301, the second data volume report sent by the SN to the MN includes identifiers of one or more PDU sessions that are of the terminal device and that pass through the SN and data volume information of the one or more PDU sessions. Data volume information of one PDU session includes a sum of data volumes of all of one or more QoS flows of the PDU session (that is, a data volume of the PDU session passing through the SN). Optionally, data volume information of one PDU session further includes at least one of QFIs of one or more QoS flows of the PDU session, identifiers of DRBs to which the one or more QFIs are mapped, bearer types of the one or more QoS flows, and identifiers of network slices to which the one or more QoS flows belong.

Correspondingly, in step 302, in a possible implementation, the first data volume report includes identifiers of one or more PDU sessions that are of the terminal device and that pass through the SN and data volume information of the one or more PDU sessions. Data volume information of one PDU session includes a sum of data volumes of all of one or more QoS flows of the PDU session (that is, a data volume of the PDU session passing through the SN). Optionally, data volume information of one PDU session further includes at least one of QFIs of one or more QoS flows of the PDU session, bearer types of the one or more QoS flows, and identifiers of network slices to which the one or more QoS flows belong. In another possible implementation, the MN sums up data volumes of all of one or more QoS flows of a same network slice in the second data volume report reported by the SN, to form the first data volume report. In this implementation, the first data volume report includes identifiers of one or more network slices that are of the terminal device and that pass through the SN and data volume information of the one or more network slices. Data volume information of one network slice includes a sum of data volumes of all of one or more QoS flows of the network slice (that is, a data volume of the network slice passing through the SN). Optionally, data volume information of one network slice further includes at least one of QFIs of one or more QoS flows of the network slice, bearer types of the one or more QoS flows, and identifiers of PDU sessions to which the one or more QoS flows belong.

Optionally, in step 301, the second data volume report sent by the SN to the MN includes identifiers of one or more network slices that are of the terminal device and that pass through the SN and data volume information of the one or more network slices. Data volume information of one network slice includes a sum of data volumes of all of one or more QoS flows of the network slice (that is, a data volume of the network slice passing through the SN). Optionally, data volume information of one network slice further includes at least one of QFIs of one or more QoS flows of the network slice, identifiers of DRBs to which the one or more QoS flows are mapped, bearer types of the one or more QoS flows, and identifiers of PDU sessions to which the one or more QoS flows belong.

Correspondingly, in step 302, the first data volume report formed by the MN includes identifiers of one or more network slices that are of the terminal device and that pass through the SN and data volume information of the one or more network slices. Data volume information of one network slice includes a sum of data volumes of all of one or more QoS flows of the network slice (that is, a data volume of the network slice passing through the SN). Optionally, data volume information of One network slice further includes at least one of QFIs of one or more QoS flows of the network slice, bearer types of the one or more QoS flows, and identifiers of PDU sessions to which the one or more QoS flows belong.

Optionally, in step 302, the first data volume report formed by the MN includes a sum of data volumes of all of one or more QoS flows that are of the terminal device and that pass through the SN (that is, the volume of the data that is of the terminal device and that passes through the SN).

It should be understood that the SN data volume request, the second data volume report, and the first data volume report may be separately carried in different messages. For example, the SN data volume request may be carried in a second ratio access technology (RAT) data volume report request message, a second RAT report request message, or another message. The second data volume report and/or the first data volume report may be separately carried in a second RAT data volume report message, a second RAT report message, a second RAT data volume report response message, a second RAT report response message, or another message. This is not limited in this embodiment of this application.

According to the foregoing steps in this embodiment of this application, reporting of the volume of the data that is of the terminal device and that passes through the SN in the SN terminated bearer type in the multi-connectivity scenario is implemented. Further, reporting of data volumes at different service data granularities (such as a QoS flow granularity, a QoS flow group granularity, a PDU session granularity, and a network slice granularity) is implemented, so that a core network can obtain the data volumes at the different service data granularities, to provide a basis for flexible traffic charging.

Figure 4:
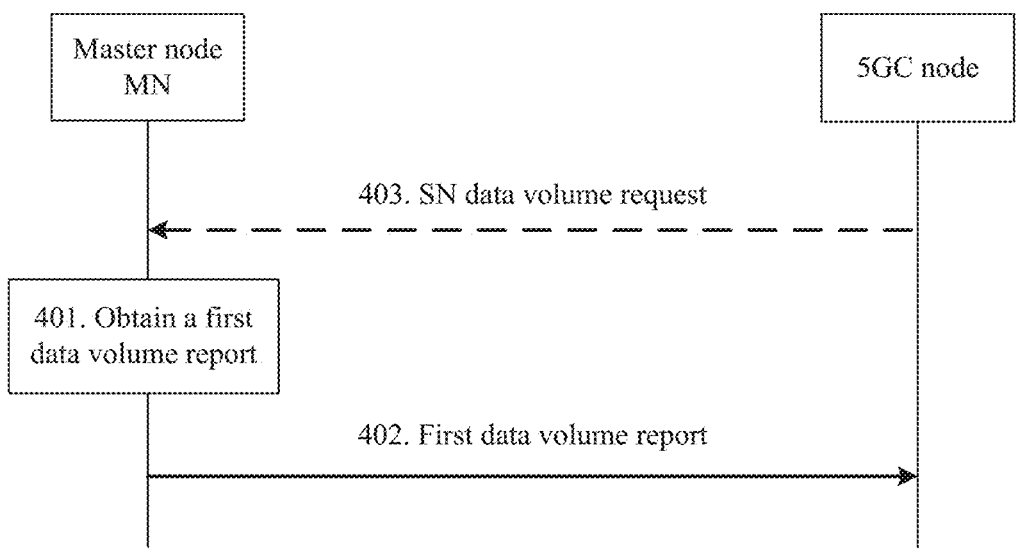
FIG. 4 is a schematic flowchart of another data volume reporting method in a multi-connectivity scenario according to an embodiment of this application.

FIG. 4 is a schematic flowchart of a data volume reporting method 400 in another multi-connectivity scenario according to an embodiment of this application. The method 400 may be applied to interaction between the master node 140, the secondary node 142, and the 5GC 180 shown in FIG. 1 in an MN terminated bearer type. The procedure in FIG. 4 includes the following steps.

401. An MN obtains a first data volume report.

In this step, the MN obtains the first data volume report of a volume of data that is of a terminal device and that passes through an SN. In this embodiment of this application, because a PDCP layer for processing a user plane data bearer of the terminal device is located in the MN, the MN may count a data volume of service data that is of an MN terminated SCG bearer and/or an MN terminated split bearer of the terminal device and that passes through the SN. That an MN obtains a first data volume report may be specifically that the MN forms the first data volume report based on a result of counting a volume of data passing through the SN.

For example, the terminal device performs multi-connectivity communication of an MN terminated bearer type with a plurality of network nodes, including an MN terminated SCG bearer and/or an MN terminated split bearer. Service data that is of the MN terminated. SCG bearer and/or the MN terminated split bearer of the terminal device and that passes through the SN includes data of a first PDU session and data of a second PDU session. The first PDU session passing through the SN includes a first QoS flow, a second QoS flow, and a third QoS flow, the first QoS flow and the second QoS flow are mapped to a first DRB, the third QoS flow is mapped to a second DRB, and the first QoS flow, the second QoS flow, and the third QoS flow belong to the MN terminated SCG bearer type. The second PDU session passing through the SN includes a fourth QoS flow and a fifth QoS flow, the fourth QoS flow and the fifth QoS flow are mapped to a third DRB, and the fourth QoS flow and the fifth QoS flow belong to the MN terminated split bearer type. The first PDU session belongs to a first network slice, and the second PDU session belongs to a second network slice. It should be understood that the first PDU session and the second PDU session may further separately include another QoS flow that does not pass through the SN. The first network slice and the second network slice may further separately include another PDU session that does not pass through the SN.

In a possible implementation, the first data volume report includes QFIs of one or more QoS flows that are of each of one or more PDU sessions of the terminal device and that pass through the SN, identifiers of PDU sessions to which the one or more QoS flows belong, and data volumes of the one or more QoS flows. It should be understood that the data volumes of the one or more QoS flows may be data volumes of all of the one or more QoS flows passing through the SN, or may be a sum of data volumes of all of the one or more QoS flows passing through the SN. Optionally, the first data volume report further includes bearer types of the one or more QoS flows passing through the SN and/or identifiers of network slices to which the one or more QoS flows belong. Corresponding to the foregoing example, the first data volume report includes an identifier of the first PDU session, a QFI of the first QoS flow, and a data volume of the first QoS flow passing through the SN; a QFI of the second QoS flow and a data volume of the second QoS flow passing through the SN; a QFI of the third QoS flow and a data volume of the third QoS flow passing through the SN; an identifier of the second PDU session, a QFI of the fourth QoS flow, and a data volume of the fourth QoS flow passing through the SN; and a QFI of the fifth QoS flow and a data volume of the fifth QoS flow passing through the SN. Optionally, the first data volume report further includes the SCG bearer type, the split bearer type, an identifier of the first network slice, and an identifier of the second network slice. It should be noted that data of one QoS flow passing through the SN may be all data of the QoS flow, or may be a part of data of the QoS flow. For example, for the SN terminated SCG bearer, all data of one QoS flow passes through the SN and a data volume of the QoS flow passing through the SN is a data volume of all the data of the QoS flow in this case. For the SN terminated split bearer, a part of data of one QoS flow passes through the SN and another part of data passes through the MN, and a data volume of the QoS flow passing through the SN is a data volume of the part of data that is of the QoS flow and that passes through the SN.

In another possible implementation, the first data volume report includes data volume information of one or more QoS flow groups that are of each of one or more PDU sessions of the terminal device and that pass through the SN. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the SN). Optionally, data volume information of one QoS flow group further includes bearer types of one or more QoS flows in the QoS flow group and/or identifiers of network slices to which the one or more QoS flows belong. Corresponding to the foregoing example, if the first QoS flow and the second QoS flow belong to a first QoS flow group, the third QoS flow belongs to a second QoS flow group, and the fourth QoS flow and the fifth QoS flow belong to a third QoS flow group, the first data volume report may include an identifier of the first PDU session, a QFI of the first QoS flow, a QFI of the second QoS flow, and a sum of data volumes of the first QoS flow and the second QoS flow passing through the SN (that is, a data volume of the first QoS flow group passing through the SN); a QFI of the third QoS flow and a data volume of the third QoS flow passing through the SN (that is, a data volume of the second QoS flow group passing through the SN); and an identifier of the second PDU session, a QFI of the fourth QoS flow, a QFI of the fifth QoS flow, and a sum of data volumes of the fourth QoS flow and the fifth QoS flow passing through the SN (that is, a data volume of the third QoS flow group passing through the SN). Optionally, the first data volume report further includes the SCG bearer type, the split bearer type, an identifier of the first network slice, and an identifier of the second network slice.

In still another possible implementation, the first data volume report includes identifiers of one or more PDU sessions that are of the terminal device and that pass through the SN and data volume information of the one or more PDU sessions. Data volume information of one PDU session includes a sum of data volumes of all of one or more QoS flows of the PDU session (that is, a data volume of the PDU session passing through the SN). Optionally, data volume information of one PDU session further includes at least one of QFIs of one or more QoS flows of the PDU session, bearer types of the one or more QoS flows, and identifiers of network slices to which the one or more QoS flows belong. Corresponding to the foregoing example, the first data volume report includes an identifier of the first PDU session and a sum of data volumes of the first QoS flow to the third QoS flow passing through the SN (that is, a data volume of the first PDU session passing through the SN); and an identifier of the second PDU session and a sum of data volumes of the fourth QoS flow and the fifth QoS flow passing through the SN (that is, a data volume of the second PDU session passing through the SN). Optionally, the first data volume report further includes QFIs of the first QoS flow to the fifth QoS flow, the SCG bearer type, the split bearer type, an identifier of the first network slice, and an identifier of the second network slice.

In yet another possible implementation, the first data volume report includes identifiers of one or more network slices that are of the terminal device and that pass through the SN and data volume information of the one or more network slices. Data volume information of one network slice includes a sum of data volumes of all of one or more QoS flows of the network slice (that is, a data volume of the network slice passing through the SN). Optionally, data volume information of one network slice further includes QFIs of one or more QoS flows of the network slice, bearer types of the one or more QoS flows, and identifiers of PDU sessions to which the one or more QoS flows belong. Corresponding to the foregoing example, the first data volume report includes an identifier of the first network slice and a sum of data volumes of the first QoS flow to the third QoS flow passing through the SN (that is, a data volume of the first network slice passing through the SN); and an identifier of the second network slice and a sum of data volumes of the fourth QoS flow and the fifth QoS flow passing through the SN (that is, a data volume of the second network slice passing through the SN). Optionally, the first data volume report further includes QFIs of the first QoS flow to the fifth QoS flow, the SCG bearer type, the split bearer type, an identifier of the first PDU session, and an identifier of the second PDU session.

In still yet another possible implementation, the first data volume report includes a sum of data volumes of all of one or more QoS flows that are of the terminal device and that pass through the SN (that is, the volume of the data that is of the terminal device and that passes through the SN).

402. The MN sends the first data volume report to a 5GC node.

Optionally, the 5GC node is an AMF.

It should be noted that, if the terminal device implements multi-connectivity by using a plurality of SNs, the MN forms a first data volume report for each of a part or all of the plurality of SNs in step 401, and sends one or more first data volume reports to the 5GC node in step 402. In this case, the first data volume report further includes an identifier of the SN, such as a base station identifier of the SN and a cell identifier list of the SN. It should be understood that if the MN sends a plurality of first data volume reports to the 5GC node, the MN may add the plurality of first data volume reports to one message and send the message to the 5GC node, or may separately send the plurality of first data volume reports to the 5GC node by using a plurality of messages.

Optionally, before the MN forms the first data volume report, this embodiment of this application further includes step 403.

403. The 5GC node sends an SN data volume request to the MN.

In this step, the 5GC node requests the MN to send the volume of the data that is of the terminal device and that passes through the SN. The request may instruct the MN to report the volume of the data that is of the terminal device and that passes through the SN, or may instruct the MN to report, in a specific condition (for example, in an SN modification procedure initiated by the MN, an SN release procedure initiated by the MN, or an SN release procedure initiated by the SN), the volume of the data that is of the terminal device and that passes through the SN, or may instruct the MN to report, in a specific time period, the volume of the data that is of the terminal device and that passes through the SN, or the like. Optionally, the request includes: the MN reports, in a specified manner, the volume of the data that is of the terminal device and that passes through the SN, for example, a data volume of all service data that is of the terminal device and that passes through the SN, data volumes of one or more PDU sessions that are of the terminal device and that pass through the SN, data volumes of one or more QoS flow groups that are of the terminal device and that pass through the SN, and data volumes of one or more QoS flows that are of the terminal device and that pass through the SN. Further, the request may further include a classification criterion indicating a QoS flow group for SN data volume reporting.

If the terminal device implements multi-connectivity by using a plurality of SNs, the SN data volume request further includes identifiers of one or more SNs.

It should be understood that the SN data volume request and the first data volume report may be separately carried in different messages. For example, the SN data volume request may be carried in a second ratio access technology (RAT) data volume report request message, a second RAT report request message, or another message. The first data volume report may be carried in a second RAT data volume report message, a second RAF report message, a second RAT data volume report response message, a second RAT report response message, or another message. This is not limited in this embodiment of this application.

According to the foregoing steps in this embodiment of this application, reporting of the volume of the data that is of the terminal device and that passes through the SN in the MN terminated bearer type in the multi-connectivity scenario is implemented. Further, reporting of data volumes at different service data granularities (such as a QoS flow granularity, a QoS flow group granularity, a PDU session granularity, and a network slice granularity) is implemented, so that a core network can obtain the data volumes at the different service data granulanities, to provide a basis for flexible traffic charging.

Figure 5:
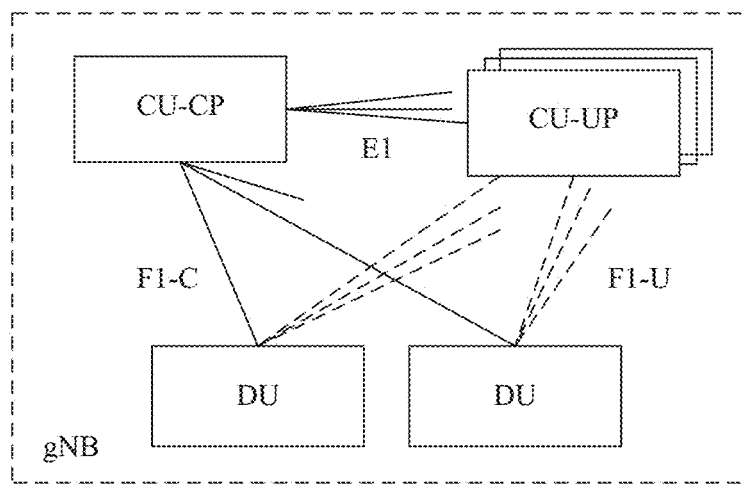
FIG. 5 is an architecture of a gNB divided into a CU-CP, a CU-UP, and a DU according to an embodiment of this application.

In a 5G system, an access network node gNB may be further divided into a central unit (CU) and a distributed unit (DU) based on a protocol stack, where the CU is responsible for operations of an RRC layer, an SDAP layer, and a PDCP layer, and the DU is responsible for operations of an RILE layer, a MAC layer, and a PHY layer. Further, the CU may be further divided into a control plane central unit (CU-CP) and a user plane central unit (CU-UP), where the CU-CP is responsible for control plane processing of the RRC layer and the PDCP layer, and the CU-UP is responsible for user plane processing of the SDAP layer and the PDCP layer. FIG. 5 shows an architecture of a gNB divided into a CU-CP, a CU-UP, and a DU. One gNB may include one CU-CP, one or more CU-UPs, and one or more DUs. One CU-CP is connected to only one CU-CP through an E1 interface; one DU is connected to only one CU-CP through an F1-C interface; and under control of the CU-CP, one DU may be connected to one or more CU-UPs, one CU-UP may also be connected to one or more DUs, and the CU-UP is connected to the DU through an F1-U interface. It should be noted that, to maintain network elasticity, one DU and/or one CU-UP may also be connected to a plurality of CU-CPs. It should be understood that a manner in which the gNB is divided into the CU and the DU based on the protocol stack is merely an example, and the gNB may be divided into the CU and the DU based on another protocol stack. For example, the CU may be responsible for an operation of the RLC layer, or the DU is responsible for a user plane operation of the PDCP layer. This is not limited in this application.

In this architecture, when a terminal device performs multi-connectivity communication with a network, the terminal device performs wireless communication with a plurality of DUs, and is connected to the CU by using the DU and connected to a 5GC by using the CU. In this case, one DU and a CU-UP connected to the DU are similar to a user plane function of the master node 140 or the secondary node 142 shown in FIG. 1, and a CU-CP is similar to a control plane function of the master node 140 shown in FIG. 1. The CU-CP may be connected to a 5GC node through an NG-C interface, and the CU-UP may be connected to the 5GC node through an NG-U interface.

Figure 6:
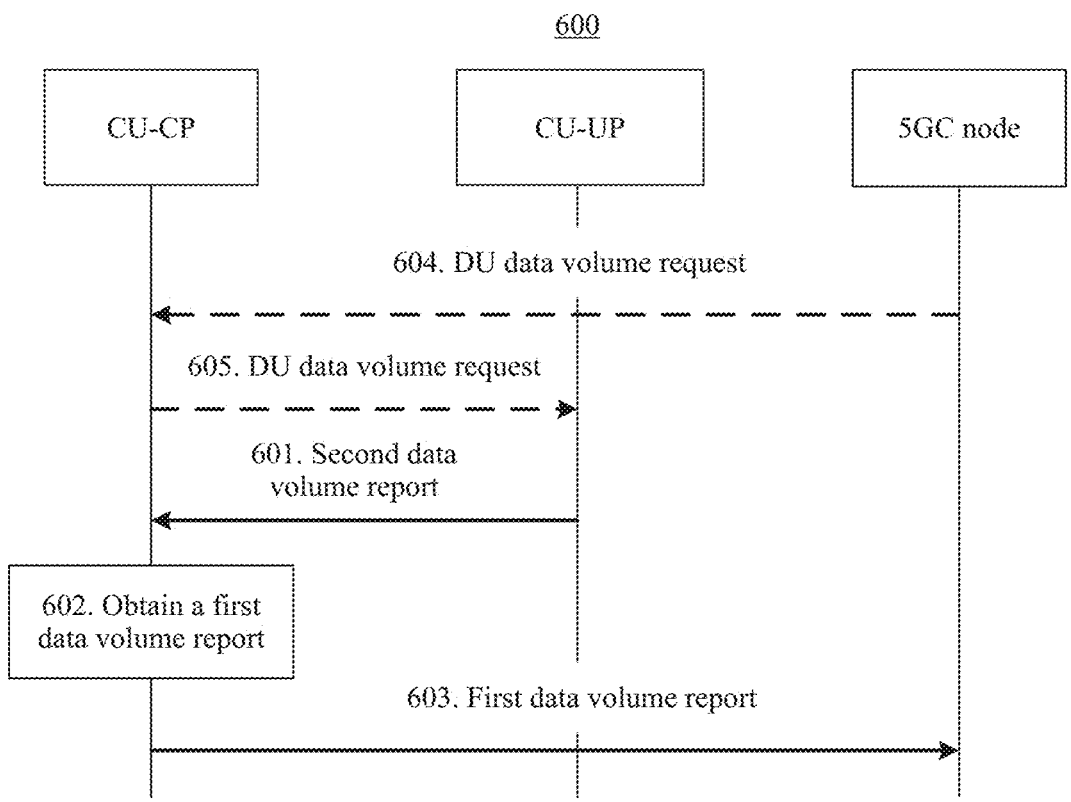
FIG. 6 is a schematic flowchart of still another data volume reporting method in a multi-connectivity scenario according to an embodiment of this application.

FIG. 6 is a schematic flowchart of still another data volume reporting method 600 in a multi-connectivity scenario according to an embodiment of this application. The method 600 is applicable to reporting of data volumes of one of one or more DUs connected to one CU-UP, and may be applied to interaction between the CU-CP, the CU-UP, and the 5GC node shown in FIG. 5. The procedure in FIG. 6 includes the following steps.

601. A CU-UP sends a second data volume report to a CU-CP.

in this step, the CU-UP sends, to the CU-CP, the second data volume report of volumes of data that is of a terminal device and that passes through one or more DUs connected to the CU-UP. The second data volume report includes identifiers of the one or more DUs that are connected to the CU-UP and through which the terminal device passes and data volume information of the one or more DUs. Data volume information of one DU includes QFIs of one or more QoS flows passing through the DU, identifiers of PDU sessions to which the one or more QoS flows belong, and data volumes of the one or more QoS flows. It should be understood that the data volumes of the one or more QoS flows may be data volumes of all of the one or more QoS flows passing through the DU, or may be a sum of data volumes of all of the one or more QoS flows passing through the DU. Data of one QoS flow passing through one DN may be all data of the QoS flow, or may be a part of data of the QoS flow. Optionally, data volume information of one DU further includes identifiers of DRBs to which one or more QoS flows passing through the DU are mapped and/or identifiers of network slices to which the one or more QoS flows belong. It should be noted that, when one DU is connected to a plurality of CU-UPs, data passing through the DU may separately pass through the plurality of CU-UPs. A part of data of the DU passes through one CU-CP. In this case, the CU-UP sends, to the CU-CP, a data volume of the part of data that is of the DU and that passes through the CU-UP.

For example, Table 2 shows information elements (IF) of the second data volume report sent by the CU-UP to the CU-CP.

TABLE 2

Second data volume report sent by the CU-UP to the CU-CP

| IE/Group Name |
| --- |
| > DU ID |
| >> PDU session ID |
| >> S-NSSAI |
| >>> Bearer list |
| >>>> Bearer ID |
| >>>>> Data volume per QoS flow |
| ... |

The DU ID indicates an identifier of a DU through which data passes, such as a gNB-DU identifier, a gNB-DU name, or one or more NR cell global identifiers (NCGI), where a volume of the data is reported by the CU-UP to the CU-CP. The PDU session ID indicates identifiers that are of PDU sessions to which one or more QoS flows passing through the DU belong and that are sent by the CU-UP to the CU-CP. The S-NSSAI indicates identifiers of network slices to which the one or more QoS flows belong. The bearer list is a DRB identifier list, and is used to indicate identifiers of one or more DRBs to which the one or more QoS flows are mapped. The data volume per QoS flow is used to indicate a data volume of one QoS flow that is of the terminal device and that passes through the DU, including a QFI of the QoS flow, a start counting time Starttimestamp and an end counting time Endtimestamp at which the CU-UP counts a data volume, an uplink data volume UsagecountUL of the QoS flow passing through the DU, and a downlink data volume UsagecountDL of the QoS flow passing through the DU. It should be understood that when the second data volume report includes volumes of data passing through a plurality of DUs, the second data volume report includes a plurality of information element groups shown in Table 2, that is, includes identifiers of the plurality of DUs and a volume of data passing through each DU. In addition, if the CU-UP counts, at a same start counting time and a same end counting time, data volumes of a plurality of QoS flows passing through the DU connected to the CU-UP, each data volume per QoS flow entry does not need to include a respective start counting time IE or a respective end counting time IE, but places the start counting time IE and the end counting time IE outside the data volume per QoS flow entry as common parameters for counting a data volume of each QoS flow.

602. The CU-CP obtains a first data volume report.

In this step, the CU-CP obtains the first data volume report based on the second data volume report that is reported by the CU-UP and that is received in step 601. IEs included in the first data volume report may be partially or totally the same as IEs included in the second data volume report.

In a possible implementation, the first data volume report includes identifiers of the one or more DUs that are connected to the CU-UP and through which the terminal device passes and data volume information of the one or more DUs. Data volume information of one DU includes QFIs of one or more QoS flows passing through the DU, identifiers of PDU sessions to which the one or more QoS flows belong, and data volumes of the one or more QoS flows. Optionally, data volume information of one DU further includes identifiers of network slices to which one or more QoS flows passing through the DU belong.

In another possible implementation, for one DU connected to the CU-UP, the CU-CP sums up data volumes, in the second data volume report reported by the CU-UP, of all QoS flows in a same QoS flow group passing through the DU, to form the first data volume report. One QoS flow group includes one or more QoS flows of one PDU session that pass through one DU. A network classifies different QoS flows into different QoS flow groups according to a specific criterion, for example, a 5GC-based charging policy, a DRB-based granularity, or an indication sent by a 5GC, to classify one or more QoS flows into one QoS flow group. In this implementation, for one DU connected to the CU-UP, the first data volume report includes data volume information of one or more QoS flow groups that are of the terminal device and that pass through the DU. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the DU). Optionally, data, volume information of one QoS flow group further includes identifiers of network slices to which one or more QoS flows in the QoS flow group belong.

In still another possible implementation, for one DU connected to the CU-UP, the CU-CP sums up data volumes, in the second data volume report reported by the CU-UP, of all of one or more QoS flows of a same PDU session passing through the DU, to form the first data volume report. In this implementation, for one DU connected to the CU-UP, the first data volume report includes identifiers of one or more PDU sessions that are of the terminal device and that pass through the DU and data volume information of the one or more PDU sessions. Data volume information of one PDU session includes a sum of data volumes of all of one or more QoS flows of the PDU session (that is, a data volume of the PDU session passing through the DU). Optionally, data volume information of one PDU session further includes QFIs of one or more QoS flows of the PDU session and/or identifiers of network slices to which the one or more QoS flows belong.

In yet another possible implementation, for one DU connected to the CU-UP, the CU-CP sums up data volumes, in the second data volume report reported by the CU-UP, of all of one or more QoS flows of a same network slice passing through the DU, to form the first data volume report. In this implementation, for one DU connected to the CU-UP, the first data volume report includes identifiers of one or more network slices that are of the terminal device and that pass through the DU and data volume information of the one or more network slices. Data volume information of one network slice includes a sum of data volumes of all of one or more QoS flows of the network slice (that is, a data volume of the network slice passing through the DU). Optionally, data volume information of one network slice further includes QFIs of one or more QoS flows of the network slice and/or identifiers of PDU sessions to which the one or more QoS flows belong.

603. The CU-CP sends the first data volume report to a 5GC node.

Optionally, the 5GC node is an AMF.

It should be noted that, if the terminal device implements multi-connectivity by using a plurality of CU-UPs, a part or all of the plurality of CU-UPs separately perform step 601 to report, to the CU-CP, the volumes of the data that is of the terminal device and that passes through the one or more DUs connected to the CU-UP. By analogy, the CU-CP forms a first data volume report for each CU-UP that reports a data volume in step 602, and sends one or more first data volume reports to the 5GC node in step 603. It should be understood that if the CU-CP sends a plurality of first data volume reports to the 5GC node, the CU-CP may add the plurality of first data volume reports to one message and send the message to the 5GC node, or may separately send the plurality of first data volume reports to the 5GC node by using a plurality of messages.

Optionally, if one DU is connected to a plurality of CU-UPs, the plurality of CU-UPs separately send, to the CU-CP in the second data volume report, a volume of data passing through the DU of each CU-UP. In this case, for one DU, the CU-CP may summarize volumes of data that passes through the DU in the plurality of received second data volume reports, to form the first data volume report. In this implementation, the first data volume report includes volume information of data that is of the terminal device and that passes through the DU, that is, QFIs of one or more QoS flows passing through the DU, identifiers of PDU sessions to which the one or more QoS flows belong, and data volumes of the one or more QoS flows. Further, the first data volume report may further include identifiers of one or more DUs through which the terminal device passes and data volume information of each DU.

Optionally, before the CU-UP sends the second data volume report to the CU-CP, this embodiment of this application further includes steps 604 and 605.

604. The 5GC node sends a DU data volume request to the CU-CP.

In this step, the 5GC node requests the CU-CP to send the volumes of the data that is of the terminal device and that passes through the one or more DUs connected to the CU-UP. The request may instruct the CU-CP to report the volumes of the data that is of the terminal device and that passes through the one or more DUs, or instruct the CU-CP to report, in a specific condition (such as a DU modification procedure, a DU addition procedure, or a DU release procedure), the volumes of the data that is of the terminal device and that passes through the one or more DUs, or instruct the CU-CP to report, in a specific time period, the volumes of the data that is of the terminal device and that passes through the one or more DUs. The DU data volume request includes identifiers of the one or more DUs. Optionally, the request further includes: the CU-CP reports, in a specified manner, the volumes of the data that is of the terminal device and that passes through the one or more DUs, for example, data volumes of all service data that is of the terminal device and that passes through the one or more DUs, data volumes of one or more network slices that are of the terminal device and that pass through the one or more DUs, data volumes of one or more PDU sessions that are of the terminal device and that pass through the one or more DUs, data volumes of one or more QoS flow groups that are of the terminal device and that pass through the one or more DUs, and data volumes of one or more QoS flows that are of the terminal device and that pass through the one or more DUs.

605. The CU-CP sends the DU data volume request to the CU-UP.

In this step, the CU-CP requests the CU-UP to send the volumes of the data that is of the terminal device and that passes through the one or more DUs connected to the CU-UP. The request may instruct the CU-UP to report the volumes of the data that is of the terminal device and that passes through the one or more DUs, or instruct the CU-UP to report, in a specific condition, the volumes of the data that is of the terminal device and that passes through the one or more DUs, or instruct the CU-UP to report, in a specific time period, the volumes of the data that is of the terminal device and that passes through the one or more DUs. The DU data volume request includes identifiers of the one or more DUs. Optionally, the request further includes: the CU-UP reports, in a specified manner, the volumes of the data that is of the terminal device and that passes through the one or more DUs, for example, data volumes of all service data that is of the terminal device and that passes through the one or more DUs, data volumes of one or more network slices that are of the terminal device and that pass through the one or more DUs, data volumes of one or more PDU sessions that are of the terminal device and that pass through the one or more DUs, data volumes of one or more QoS flow groups that are of the terminal device and that pass through the one or more DUs, and data volumes of one or more QoS flows that are of the terminal device and that pass through the one or more DUs. Further, the request may further include a classification criterion indicating a QoS flow group for reporting one or more DU data volumes.

If the terminal device implements multi-connectivity by using a plurality of CU-UPs, the CU-CP sends the DU data volume request to each of a part or all of the CU-UPs.

Optionally, in step 601, for one DU connected to the CU-UP, the second data volume report sent by the CU-UP to the CU-CP includes data volume information of one or more QoS flow groups that are of the terminal device and that pass through the DU. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the DU). Optionally, data volume information of one QoS flow group further includes identifiers of DRBs to which one or more QoS flows in the QoS flow group are mapped and/or identifiers of network slices to which the one or more QoS flows belong.

Correspondingly, in step 602, in a possible implementation, for one DU connected to the CU-UP, the first data volume report includes data volume information of one or more QoS flow groups that are of the terminal device and that pass through the DU. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the DU). Optionally, data volume information of one QoS flow group further includes identifiers of network slices to which one or more QoS flows in the QoS flow group belong. In another possible implementation, for one DU connected to the CU-UP, the CU-CP sums up data volumes of all of one or more QoS flows of a same PDU session in the second data volume report reported by the CU-UP, to form the first data volume report. In this implementation, for one DU connected to the CU-UP, the first data volume report includes identifiers of one or more PDU sessions that are of the terminal device and that pass through the DU and data volume information of the one or more PDU sessions. Data volume information of one PDU session includes a sum of data volumes of all of one or more QoS flows of the PDU session (that is, a data volume of the PDU session passing through the DU). Optionally, data volume information of one PDU session further includes QFIs of one or more QoS flows of the PDU session and/or identifiers of network slices to which the one or more QoS flows belong. In still another possible implementation, for one DU connected to the CU-UP, the CU-CP sums up data volumes of all of one or more QoS flows of a same network slice in the second data volume report reported by the CU-UP, to form the first data volume report. In this implementation, for one DU connected to the CU-UP, the first data volume report includes identifiers of one or more network slices that are of the terminal device and that pass through the DU and data volume information of the one or more network slices. Data volume information of one network slice includes a sum of data volumes of all of one or more QoS flows of the network slice (that is, a data volume of the network slice passing through the DU). Optionally, data volume information of one network slice further includes QFIs of one or more QoS flows of the network slice and/or identifiers of PDU sessions to which the one or more QoS flows belong.

Optionally, in step 601, for one DU connected to the CU-UP, the second data volume report sent by the CU-UP to the CU-CP includes identifiers of one or more PDU sessions that are of the terminal device and that pass through the DU and data volume information of the one or more PDU sessions. Data volume information of one PDU session includes a sum of data volumes of all of one or more QoS flows of the PDU session (that is, a data volume of the PDU session passing through the DU). Optionally, data volume information of one PDU session further includes at least one of QFIs of one or more QoS flows of the PDU session, identifiers of DRBs to which the one or more QoS flows are mapped, and identifiers of network slices to which the one or more QoS flows belong.

Correspondingly, in step 602, in a possible implementation, for one DU connected to the CU-UP, the first data volume report includes identifiers of one or more PDU sessions that are of the terminal device and that pass through the DU and data volume information of the one or more PDU sessions. Data volume information of one PDU session includes a sum of data volumes of all of one or more QoS flows of the PDU session (that is, a data volume of the PDU session passing through the DU). Optionally, data volume information of one PDU session further includes QFIs of one or more QoS flows of the PDU session and/or identifiers of network slices to which the one or more QoS flows belong. In another possible implementation, for one DU connected to the CU-UP, the CU-CP sums up data volumes of all of one or more QoS flows of a same network slice in the second data volume report reported by the CU-UP, to form the first data volume report. In this implementation, for one DU connected to the CU-UP, the first data volume report includes identifiers of one or more network slices that are of the terminal device and that pass through the DU and data volume information of the one or more network slices. Data volume information of one network slice includes a sum of data volumes of all of one or more QoS flows of the network slice (that is, a data volume of the network slice passing through the DU). Optionally, data volume information of one network slice further includes QFIs of one or more QoS flows of the network slice and/or identifiers of PDU sessions to which the one or more QoS flows belong.

Optionally, in step 601, for one DU connected to the CU-UP, the second data volume report sent by the CU-UP to the CU-CP includes identifiers of one or more network slices that are of the terminal device and that pass through the DU and data volume information of the one or more network slices. Data volume information of one network slice includes a sum of data volumes of all of one or more QoS flows of the network slice (that is, a data volume of the network slice passing through the DU). Optionally, data volume information of one network slice further includes at least one of QFIs of one or more QoS flows of the network slice, identifiers of DRBs to which the one or more QoS flows are mapped, and identifiers of PDU sessions to which the one or more QoS flows belong.

Correspondingly, in step 602, the first data volume report formed by the CU-CP includes identifiers of one or more network slices that are of the terminal device and that pass through the DU and data volume information of the one or more network slices. Data volume information of one network slice includes a shown of data volumes of all of one or more QoS flows of the network slice (that is, a data volume of the network slice passing through the DU). Optionally, data volume information of one network slice further includes QFIs of one or more QoS flows of the network slice and/or identifiers of PDU sessions to which the one or more QoS flows belong.

It should be understood that the DU data volume request, the second data volume report, and the first data volume report may be separately carried in different messages. For example, the DU data volume request may be carried in a DU data volume report request message, a DU report request message, or another message. The second data volume report and/or the first data volume report may be separately carried in a second RAT data volume report message, a second RAF report message, a second RAT data volume report response message, a second RAT report response message, or another message. This is not limited in this embodiment of this application.

According to the foregoing steps in this embodiment of this application, reporting of a volume of data that is of the terminal device and that passes through each DU in a multi-connectivity CU/DU architecture is implemented. Further, reporting of data volumes at different service data granularities (such as a QoS flow granularity, a QoS flow group granularity, a PDU session granularity, and a network slice granularity) is implemented, so that a core network can obtain the data volumes at the different service data granularities, to provide a basis for flexible traffic charging.

Figure 7:
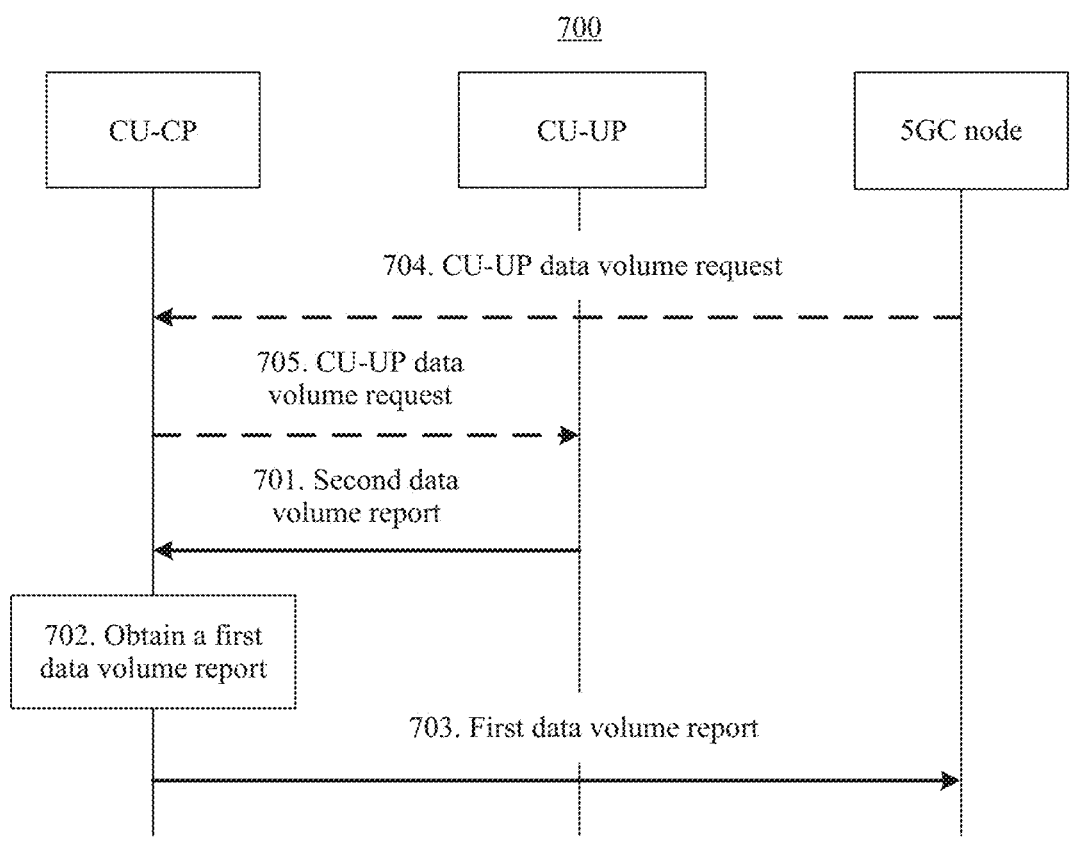
FIG. 7 is a schematic flowchart of yet another data volume reporting method in a multi-connectivity scenario according to an embodiment of this application.

FIG. 7 is a schematic flowchart of yet another data volume reporting method 700 in a multi-connectivity scenario according to an embodiment of this application. The method 700 is applicable to reporting of a sum of data volumes of all of one or more DUs connected to one CU-UR and may be applied to interaction between the CU-CR the CU-UP, and the 5GC node shown in FIG. 5. The procedure in FIG. 7 includes the following steps.

701. A CU-UP sends a second data volume report to a CU-CR

In this step, the CU-UP sends, to the CU-CR the second data volume report of a volume of data that is of a terminal device and that passes through a DU connected to the CU-UP. It should be understood that there may be one or more DUs connected to the CU-UP. The second data volume report includes QFIs of one or more QoS flows that are of the terminal device and that pass through the DU connected to the CU-UP, identifiers of PDU sessions to which the one or more QoS flows belong, and data volumes of the one or more QoS flows passing through the DU connected to the CU-UP. It should be understood that the data volumes of the one or more QoS flows passing through the DU connected to the CU-UP may be data volumes of all of the one or more QoS flows passing through the DU connected to the CU-UP, or may be a sum of data volumes of all of the one or more QoS flows passing through the DU connected to the CU-UP. A data volume of one QoS flow passing through the DU connected to the CU-UP is a sum of data volumes of the QoS flow passing through all DUs connected to the CU-UP. Optionally, the second data volume report further includes at least one of identifiers of all DUs that are connected to the CU-UP and through which the one or more QoS flows pass, identifiers of DRBs to which the one or more QoS flows are mapped, and identifiers of network slices to which the one or more QoS flows belong.

702. The CU-CP obtains a first data volume report.

In this step, the CU-CP obtains the first data volume report based on the second data volume report that is reported by the CU-UP and that is received in step 701. IEs included in the first data volume report may be partially or totally the same as IEs included in the second data volume report.

In a possible implementation, the first data volume report includes QFIs of one or more QoS flows that are of the terminal device and that pass through the DU connected to the CU-UP, identifiers of PDU sessions to which the one or more QoS flows belong, and data volumes of the one or more QoS flows passing through the DU connected to the CU-UP. Optionally, the first data volume report further includes identifiers of all DUs that are connected to the CU-UP and through which the one or more QoS flows pass and/or identifiers of network slices to which the one or more QoS flows belong.

In another possible implementation, the CU-CP sums up data volumes, in the second data volume report reported by the CU-UP, of all of one or more QoS flows in a same QoS flow group passing through the DU connected to the CU-UP, to form the first data volume report. One QoS flow group includes one or more QoS flows of one PDU session that pass through one DU. A network classifies different QoS flows into different QoS flow groups according to a specific criterion, for example, a 5GC-based charging policy, a DRB-based granularity, or an indication sent by a 5GC, to classify one or more QoS flows into one QoS flow group. In this implementation, the first data volume report includes data volume information of one or more QoS flow groups that are of the terminal device and that pass through the DU connected to the CU-UP. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the DU connected to the CU-UP). Optionally, data volume information of one QoS flow group further includes identifiers of all DUs that are connected to the CU-UP and through which one or more QoS flows in the QoS flow group pass and/or identifiers of network slices to which the one or more QoS flows belong.

In still another possible implementation, the CU-CP sums up data volumes, in the second data volume report reported by the CU-UP, of all of one or more QoS flows of a same PDU session passing through the DU connected to the CU-UP, to form the first data volume report. In this implementation, the first data volume report includes identifiers of one or more PDU sessions that are of the terminal device and that pass through the DU connected to the CU-UP and data volume information of the one or more PDU sessions. Data volume information of one PDU session includes a sum of data volumes of all of one or more QoS flows of the PDU session (that is, a data volume of the PDU session passing through the DU connected to the CU-UP). Optionally, data volume information of one PDU session further includes QFIs of one or more QoS flows of the PDU session, identifiers of all DUs that are connected to the CU-UP and through which the one or more QoS flows pass, and/or identifiers of network slices to which the one or more QoS flows belong.

In yet another possible implementation, the CU-CP sums up data volumes, in the second data volume report reported by the CU-UP, of all of one or more QoS flows of a same network slice passing through the DU connected to the CU-UP, to form the first data volume report. In this implementation, the first data volume report includes identifiers of one or more network slices that are of the terminal device and that pass through the DU connected to the CU-UP and data volume information of the one or more network slices. Data volume information of one network slice includes a sum of data volumes of all of one or more QoS flows of the network slice (that is, a data volume of the network slice passing through the DU connected to the CU-UP). Optionally, data volume information of one network slice further includes QFIs of one or more QoS flows of the network slice, identifiers of all DUs that are connected to the CU-UP and through which the one or more QoS flows pass, and/or identifiers of PDU sessions to which the one or more QoS flows belong.

703. The CU-CP sends the first data volume report to a 5GC node.

Optionally, the 5GC node is an AMF.

It should be noted that, if the terminal device implements multi-connectivity by using a plurality of CU-UPs, a part or all of the plurality of CU-UPs separately perform step 701 to report, to the CU-CP, volumes of data that is of the terminal device and that passes through the one or more DUs connected to the CU-UP. By analogy, the CU-CP forms a first data volume report, for each CU-UP that reports a data volume in step 702, and sends one or more first data volume reports to the 5GC node in step 703. It should be understood that if the CU-CP sends a plurality of first data volume reports to the 5GC node, the CU-CP may add the plurality of first data volume reports to one message and send the message to the 5GC node, or may separately send the plurality of first data volume reports to the 5GC node by using a plurality of messages.

Optionally, before the CU-UP sends the second data volume report to the CU-CP, this embodiment of this application further includes steps 704 and 705.

704. The 5GC node sends a CU-UP data volume request to the CU-CR

In this step, the 5GC node requests the CU-CP to send the volume of the data that is of the terminal device and that passes through the DU connected to the CU-UP. The request may instruct the CU-CP to report the volume of the data that is of the terminal device and that passes through the DU connected to the CU-UP, or instruct the CU-CP to report, in a specific condition (such as a DU modification procedure, a DU addition procedure, or a DU release procedure), the volume of the data that is of the terminal device and that passes through the DU connected to the CU-UP, or instruct the CU-CP to report, in a specific time period, the volume of the data that is of the terminal device and that passes through the DU connected to the CU-UP. Optionally, the request further includes: the CU-CP reports, in a specified manner, the volume of the data that is of the terminal device and that passes through the DU connected to the CU-UP, for example, a data volume of all service data that is of the terminal device and that passes through the DU connected to the CU-UP, data volumes of one or more network slices that are of the terminal device and that pass through the DU connected to the CU-UP, data volumes of one or more PDU sessions that are of the terminal device and that pass through the DU connected to the CU-UP, data volumes of one or more QoS flow groups that are of the terminal device and that pass through the DU connected to the CU-UP, and data volumes of one or more QoS flows that are of the terminal device and that pass through the DU connected to the CU-UP.

705. The CU-CP sends the CU-UP data volume request to the CU-UP.

In this step, the CU-CP requests the CU-UP to send the volume of the data that is of the terminal device and that passes through the DU connected to the CU-UP. The request may instruct the CU-UP to report the volume of the data that is of the terminal device and that passes through the DU connected to the CU-UP, or instruct the CU-UP to report, in a specific condition, the volume of the data that is of the terminal device and that passes through the DU connected to the CU-UP, or instruct the CU-UP to report, in a specific time period, the volume of the data that is of the terminal device and that passes through the DU connected to the CU-UP. Optionally, the request further includes: the CU-UP reports, in a specified manner, the volume of the data that is of the terminal device and that passes through the DU connected to the CU-UP, for example, a data volume of all service data that is of the terminal device and that passes through the DU connected to the CU-UP, data volumes of one or more network slices that are of the terminal device and that pass through the DU connected. to the CU-UP, data volumes of one or more PDU sessions that are of the terminal device and that pass through the DU connected to the CU-UP, data volumes of one or more QoS flow groups that are of the terminal device and that pass through the DU connected to the CU-UP, and data volumes of one or more QoS flows that are of the terminal device and that pass through the DU connected to the CU-UP. Further, the request may further include a classification criterion indicating a QoS flow group for DU data volume reporting.

If the terminal device implements multi-connectivity by using a plurality of CU-UPs, the CU-CP sends the CU-UP data volume request to each of a part or all of the CU-UPs.

Optionally, in step 701, the second data volume report sent by the CU-UP to the CU-CP includes data volume information of one or more QoS flow groups that are of the terminal device and that pass through the DU connected to the CU-UP. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the DU connected to the CU-UP). Optionally, data volume information of one QoS flow group further includes at least one of identifiers of all DUs that are connected to the CU-UP and through which one or more QoS flows in the QoS flow group pass, identifiers of DRBs to which the one or more QoS flows are mapped, and identifiers of network slices to which the one or more QoS flows belong.

Correspondingly, in step 702, in a possible implementation, the first data volume report formed by the CU-CP includes data volume information of one or more QoS flow groups that are of the terminal device and that pass through the DU connected to the CU-UP. Data volume information of one QoS flow group includes QFIs of one or more QoS flows in the QoS flow group, identifiers of PDU sessions to which the one or more QoS flows belong, and a sum of data volumes of all QoS flows in the QoS flow group (that is, a data volume of the QoS flow group passing through the DU connected to the CU-UP). Optionally, data volume information of one QoS flow group further includes identifiers of all DUs that are connected to the CU-UP and through which one or more QoS flows in the QoS flow group pass and/or identifiers of network slices to which the one or more QoS flows belong. In another possible implementation, the CU-CP sums up data volumes of all of one or more QoS flows of a same PDU session in the second data volume report reported by the CU-UP, to form the first data volume report. In this implementation, the first data volume report includes identifiers of one or more PDU sessions that are of the terminal device and that pass through the DU connected to the CU-UP and data volume information of the one or more PDU sessions. Data volume information of one PDU session includes a sum of data volumes of all of one or more QoS flows of the PDU session (that is, a data volume of the PDU session passing through the DU connected to the CU-UP). Optionally, data volume information of one PDU session further includes at least one of QFIs of one or more QoS flows of the PDU session, identifiers of all DUs that are connected to the CU-UP and through which the one or more QoS flows pass, and identifiers of network slices to which the one or more QoS flows belong. In still another possible implementation, the CU-CP sums up data volumes of all of one or more QoS flows of a same network slice in the second data volume report reported by the CU-UP, to form the first data volume report. In this implementation, the first data volume report includes identifiers of one or more network slices that are of the terminal device and that pass through the DU connected to the CU-UP and data volume information of the one or more network slices. Data volume information of one network slice includes a sum of data volumes of all of one or more QoS flows of the network slice (that is, a data volume of the network slice passing through the DU connected to the CU-UP). Optionally, data volume information of one network slice further includes at least one of QFIs of one or more QoS flows of the network slice, identifiers of all DUs that are connected to the CU-UP and through which the one or more QoS flows pass, and identifiers of PDU sessions to which the one or more QoS flows belong.

Optionally, in step 701, the second data volume report sent by the CU-UP to the CU-CP includes identifiers of one or more PDU sessions that are of the terminal device and that pass through the DU connected to the CU-UP and data volume information of the one or more PDU sessions. Data volume information of one PDU session includes a sum of data volumes of all of one or more QoS flows of the PDU session (that is, a data volume of the PDU session passing through the DU connected to the CU-UP). Optionally, data volume information of one PDU session further includes at least one of QFIs of one or more QoS flows of the PDU session, identifiers of all DUs that are connected to the CU-UP and through which the one or more QoS flows pass, and identifiers of network slices to which the one or more QoS flows belong.

Correspondingly, in step 702, in a possible implementation, the first data volume report formed by the CU-CP includes identifiers of one or more PDU sessions that are of the terminal device and that pass through the DU connected to the CU-UP and data volume information of the one or more PDU sessions. Data volume information of one PDU session includes a sum of data volumes of all of one or more QoS flows of the PDU session (that is, a data volume of the PDU session passing through the DU connected to the CU-UP). Optionally, data volume information of one PDU session further includes at least one of QFIs of one or more QoS flows of the PDU session, identifiers of all DUs that are connected to the CU-UP and through which the one or more QoS flows pass, and identifiers of network slices to which the one or more QoS flows belong. In another possible implementation, the CU-CP sums up data volumes of all of one or more QoS flows of a same network slice in the second data volume report reported by the CU-UP, to form the first data volume report. In this implementation, the first data volume report includes identifiers of one or more network slices that are of the terminal device and that pass through the DU connected to the CU-UP and data volume information of the one or more network slices. Data volume information of one network slice includes a SUM of data volumes of all of one or more QoS flows of the network slice (that is, a data volume of the network slice passing through the DU connected to the CU-UP). Optionally, data volume information of one network slice further includes at least one of QFIs of one or more QoS flows of the network slice, identifiers of all DUs that are connected to the CU-UP and through which the one or more QoS flows pass, and identifiers of PDU sessions to which the one or more QoS flows belong.

Optionally, in step 701, the second data volume report sent by the CU-UP to the CU-CP includes identifiers of one or more network slices that are of the terminal device and that pass through the DU connected to the CU-UP and data volume information of the one or more network slices. Data volume information of one network slice includes a sum of data volumes of all of one or more QoS flows of the network slice (that is, a data volume of the network slice passing through the DU connected to the CU-UP). Optionally, data volume information of one network slice further includes at least one of QFIs of one or more QoS flows of the network slice, identifiers of all DUs that are connected to the CU-UP and through which the one or more QoS flows pass, identifiers of DRBs to which the one or more QoS flows are mapped, and identifiers of PDU sessions to which the one or more QoS flows belong.

Correspondingly, in step 702, the first data volume report formed by the CU-CP includes identifiers of one or more network slices that are of the terminal device and that pass through the DU connected to the CU-UP and data volume information of the one or more network slices. Data volume information of one network slice includes a sum of data volumes of all of one or more QoS flows of the network slice (that is, a data volume of the network slice passing through the DU connected to the CU-UP). Optionally, data volume information of one network slice further includes at least one of QFIs of one or more QoS flows of the network slice, identifiers of all DUs that are connected to the CU-UP and through which the one or more QoS flows pass, and identifiers of PDU sessions to which the one or more QoS flows belong.

It should be understood that the CU-UP data volume request, the second data volume report, and the first data volume report may be separately carried in different messages. For example, the CU-UP data volume request may be carried in a CU-UP data volume report request message, a CU-UP report request message, or another message. The second data volume report and/or the first data volume report may be separately carried in a second RAT data volume report message, a second RAT report message, a second RAT data volume report response message, a second RAT report response message, or another message. This is not limited in this embodiment of this application.

According to the foregoing steps in this embodiment of this application, reporting of a sum of volumes of data that is of the terminal device and that passes through all DUs connected to the CU-UP in a multi-connectivity CU/DU architecture is implemented. Further, reporting of data volumes at different service data granularities (such as a QoS flow granularity, a QoS flow group granularity, a PDU session granularity, and a network slice granularity) is implemented, so that a network can obtain the data volumes at the different service data granularities, to provide a basis for flexible traffic charging.

All or some of the foregoing embodiments may be implemented by software, hardware, firmware, or any combination thereof When software is used to implement the embodiments, all or some of the embodiments may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state disk (SSD)), or the like. A person skilled in the art may use different methods to implement the described functions for each particular application, but it should not be considered that the implementation goes beyond the scope of this patent application.

The foregoing describes in detail the method embodiments of this application with reference to FIG. 3, FIG. 4, FIG. 6, and FIG. 7. The following describes in detail apparatus embodiments of this application with reference to FIG. 8 to FIG. 11. It should be understood that the apparatus embodiments correspond to the method embodiments. For similar descriptions, refer to the method embodiments. It should be noted that the apparatus embodiments may be used together with the foregoing methods, or may be independently used.

Figure 8:
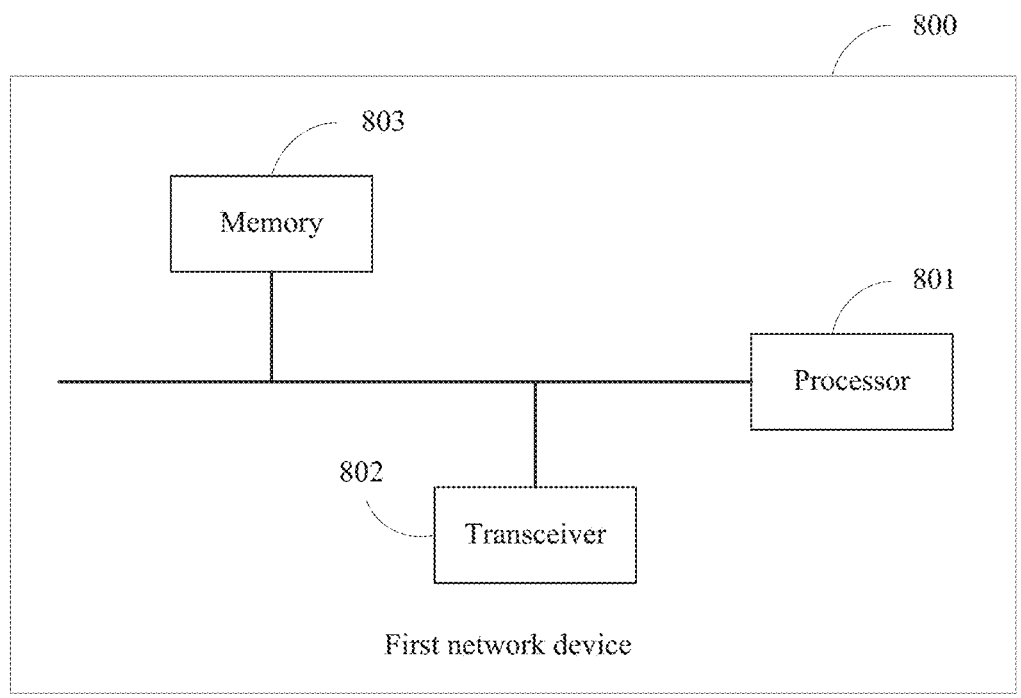
FIG. 8 is a schematic block diagram of a first network device according to an embodiment of this application.

FIG. 8 is a schematic block diagram of a first network device 800 according to an embodiment of this application. The first network device 800 may correspond to (for example, may be configured as or may be) the MN described in the method 300 or 400 or the CU-CP described in the method 600 or 700. The MN or CU-CP 800 may include a processor 801 and a transceiver 802, and the processor 801 is communicatively coupled to the transceiver 802. Optionally, the MN or CU-CP 800 further includes a memory 803, and the memory 803 is communicatively coupled to the processor 801. Optionally, the processor 801, the memory 803, and the transceiver 802 may be communicatively coupled to each other. The memory 803 may be configured to store an instruction, and the processor 801 is configured to execute the instruction stored in the memory 803, to control the transceiver 802 to receive and/or send information or a signal. The processor 801 and the transceiver 802 are separately configured to perform actions or processing processes performed by the MN described in the method 300 or 400 or the CU-CP described in the method 600 or 700. To avoid repetition, detailed descriptions thereof are omitted herein.

Figure 9:
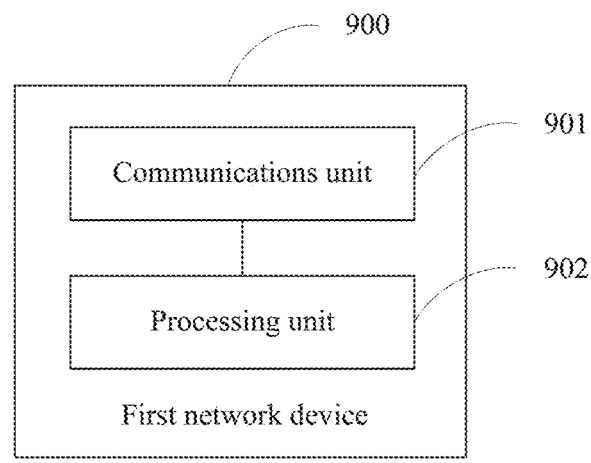
FIG. 9 is another schematic block diagram of a first network device according to an embodiment of this application.

FIG. 9 is another schematic block diagram of a first network device 900 according to an embodiment of this application. The first network device 900 may correspond to (for example, may be configured as or may be) the MN described in the method 300 or 400 or the CU-CP described in the method 600 or 700. The MN or CU-CP 900 may include a communications unit 901 and a processing unit 902, and the processing unit 902 is communicatively coupled to the communications unit 901. In this embodiment of this application, the MN or CU-CP 900 is presented in a form of a functional unit. The "unit" herein may be a processor and a memory that execute one or more software or firmware programs, an integrated logic circuit, and/or another device that can provide the foregoing function. The MN or CU-CP may use the form shown in FIG. 8. The processing unit 902 may be implemented by the processor 801 in FIG. 8, and the communications unit 901 may be implemented by the transceiver 802 in FIG. 8. The MN or CU-CP 900 may further include a storage unit, configured to store a program or data to be executed by the processing unit 902, or store information received and/or sent by using the communications unit 901. The modules or units in the MN or CU-CP 900 are separately configured to perform actions or processing processes performed by the MN described in the method 300 or 400 or the CU-CP described in the method 600 or 700. To avoid repetition, detailed descriptions thereof are omitted herein.

Figure 10:
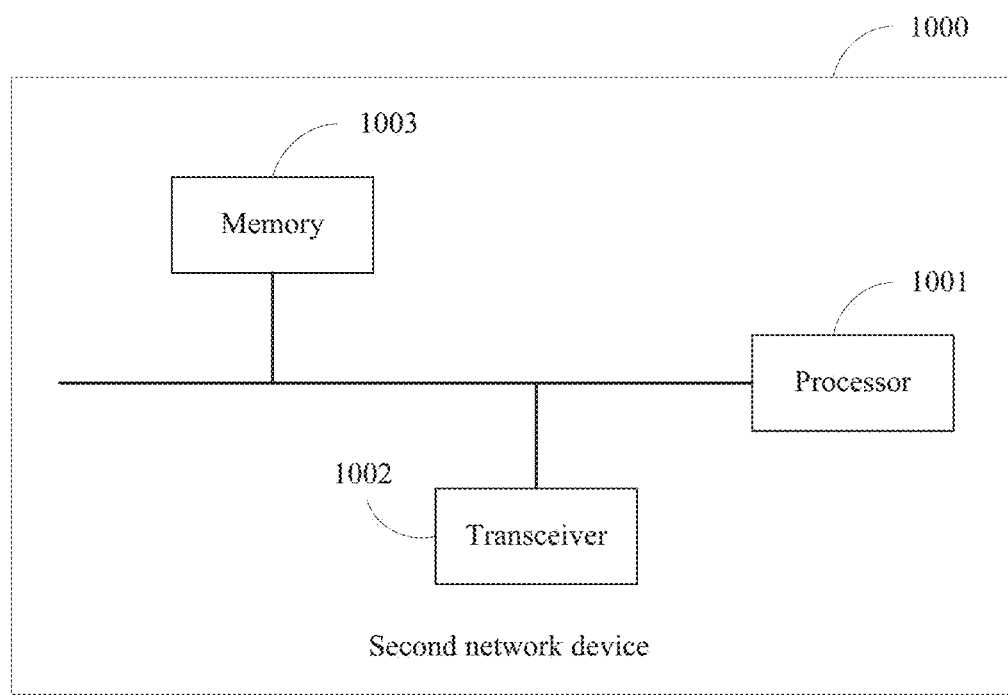
FIG. 10 is a schematic block diagram of a second network device according to an embodiment of this application.

FIG. 10 is a schematic block diagram of a second network device 1000 according to an embodiment of this application. The second network device 1000 may correspond to (for example, may be configured as or may be) the SN described in the method 300 or the CU-UP described in the method 600 or 700. The SN or CU-UP 1000 may include a processor 1001 and a transceiver 1002, and the processor 1001 is communicatively coupled to the transceiver 1002. Optionally, the SN or CU-UP 1000 further includes a memory 1003, and the memory 1003 is communicatively coupled to the processor 1001. Optionally, the processor 1001, the memory 1003, and the transceiver 1002 may be communicatively coupled to each other. The memory 1003 may be configured to store an instruction, and the processor 1001 is configured to execute the instruction stored in the memory 1003, to control the transceiver 1002 to receive and/or send information or a signal. The processor 1001 and the transceiver 1002 are separately configured to perform actions or processing processes performed by the SN in the method 300 or the CU-UP in the method 600 or 700. To avoid repetition, detailed descriptions thereof are omitted herein.

Figure 11:
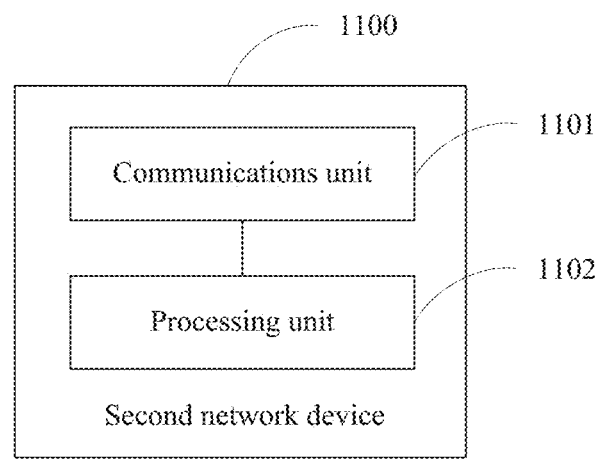
FIG. 11 is another schematic block diagram of a second network device according to an embodiment of this application.

FIG. 11 is another schematic block diagram of a second network device 1100 according to an embodiment of this application. The second network device 1100 may correspond to (for example, may be configured as or may be) the SN described in the method 300 or the CU-UP described in the method 600 or 700. The SN or CU-UP 1000 may include a communications unit 1101 and a processing unit 1102, and the processing unit 1102 is communicatively coupled to the communications unit 1101. In this embodiment of this application, the SN or CU-UP 1100 is presented in a form of a functional unit. The "unit" herein may be a processor and a memory that execute one or more software or firmware programs, an integrated logic circuit, and/or another device that can provide the foregoing function. The SN or CU-UP may use the form shown in FIG. 10. The processing unit 1102 may be implemented by the processor 1001 in FIG. 10, and the communications unit 1101 may be implemented by the transceiver 1002 in FIG. 10. The SN or CU-UP 1100 may further include a storage unit, configured to store a program or data to be executed by the processing unit 1102, or store information received and/or sent by using the communications unit 1101. The modules or units in the SN or CU-UP 1100 are separately configured to perform actions or processing processes performed by the SN in the method 300 or the CU-UP in the method 600 or 700. To avoid repetition, detailed descriptions thereof are omitted herein.

It should be understood that the processor (801 or 1001) in the apparatus embodiments of this application may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory (803 or 1003) in the apparatus embodiments of this application may be a volatile memory such as a random access memory (RAM), or may be a non-volatile memory such as a read-only memory (ROM), a flash memory, a hard disk drive (HDD), or a solid-state drive (SSD), or may be a combination of the foregoing types of memories.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this patent application may be integrated into one processing unit, or each of the units may exist alone physically, or two or more units are integrated into one unit.

When functions are implemented in a form of a software functional unit and sold or used as an independent product, the functions may be stored in a computer readable storage medium. Based on such an understanding, the technical solutions of this patent application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this patent application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this patent application, but are not intended to limit the protection scope of this patent application. Any variation or replacement readily figured out by a person skilled in the art within the technical scope disclosed in this patent application shall fall within the protection scope of this patent application. Therefore, the protection scope of this patent application shall be subject to the protection scope of the claims.

What is claimed is:

1. A multi-connectivity data volume reporting method, comprising:
    receiving, by a first network device, a first data volume report, from a second network device, wherein the first data volume report indicates a volume of data that are of a terminal device and that pass through the second network device, and the first data volume report comprises identifiers of one or more protocol data unit (PDU) sessions and data volumes of the one or more PDU sessions; and
    sending, by the first network device, the first data volume report to a third network device; wherein the first network device comprises a gNB Central Unit Control Plane (gNB-CU-CP), the second network device comprises a gNB Central Unit User Plane (gNB-CU-UP), and the third network device comprises an Access and Mobility Management Function (AMF).

2. The method according to claim 1, wherein the first data volume report further comprises identifiers of one or more network slices to which the one or more PDU sessions belong.

3. The method according to claim 1, wherein the data volumes of the one or more PDU sessions are volumes of data that are of the terminal device and that pass through at least one of a secondary cell group (SCG) bearer or a split bearer of the second network device.

4. A multi-connectivity data volume reporting method, comprising:
    generating, by a second network device, a second data volume report, wherein the second data volume report indicates a volume of data that are of a terminal device and that pass through the second network device, and the second data volume report comprises identifiers of one or more protocol data unit (PDU) sessions and data volumes of the one or more PDU sessions; and
    sending, by the second network device, the second data volume report to a first network device; wherein the first network device comprises a gNB Central Unit Control Plane (gNB-CU-CP), and the second network device comprises a gNB Central Unit User Plane (gNB-CU-UP).

5. The method according to claim 4, wherein the second data volume report further comprises identifiers of one or more network slices to which the one or more PDU sessions belong.

6. The method according to claim 4, wherein the data volumes of the one or more PDU sessions are volumes of data that is of the terminal device and that pass through at least one of a secondary cell group (SCG) bearer or a split bearer of the second network device.

7. A first network device, comprising at least one processor, and a non-transitory storage coupled to the at least one processor and having processor-executable instructions stored thereon which when executed cause the at least one processor to:
    receive a first data volume report, from a second network device, wherein the first data volume report indicates a volume of data that are of a terminal device and that pass through the second network device, and the first data volume report comprises identifiers of one or more protocol data unit PDU sessions and data volumes of the one or more PDU sessions; and
    send the first data volume report to a third network device; wherein the first network device comprises a gNB Central Unit Control Plane (gNB-CU-CP), the second network device comprises a gNB Central Unit User Plane (gNB-CU-UP), and the third network device comprises an Access and Mobility Management Function (AMF).

8. The first network device according to claim 7, wherein the first data volume report further comprises identifiers of one or more network slices to which the one or more PDU sessions belong.

9. The first network device according to claim 7, wherein the data volumes of the one or more PDU sessions are volumes of data that are of the terminal device and that pass through at least one of a secondary cell group (SCG) bearer and a split bearer of the second network device.

10. A second network device, comprising at least one processor, and a non-transitory storage coupled to the at least one processor and having processor-executable instructions stored thereon which when executed cause the at least one processor to:
  generate a second data volume report, wherein the second data volume report indicates a volume of data that are of a terminal device and that pass through the second network device, and the second data volume report comprises identifiers of one or more protocol data unit (PDU) sessions and data volumes of the one or more PDU sessions; and
  send the second data volume report to a first network device; wherein the first network device comprises a gNB Central Unit Control Plane (gNB-CU-CP), and the second network device comprises a gNB Central Unit User Plane (gNB-CU-UP).

11. The second network device according to claim 10, wherein the second data volume report further comprises identifiers of one or more network slices to which the one or more PDU sessions belong.

12. The second network device according to claim 10, wherein the data volumes of the one or more PDU sessions are volumes of data that are of the terminal device and that pass through at least one of a secondary cell group (SCG) bearer and a split bearer of the second network device.

13. A non-transitory computer-readable storage medium storing programming instructions for execution by at least one processor, wherein the programming instructions instruct the at least one processor to perform operations comprising:
  receiving, by a first network device, a first data volume report, from a second network device, wherein the first data volume report indicates a volume of data that are of a terminal device and that pass through the second network device, and the first data volume report comprises identifiers of one or more protocol data unit (PDU) sessions and data volumes of the one or more PDU sessions; and
  sending, by the first network device, the first data volume report to a third network device wherein the first network device comprises a gNB Central Unit Control Plane (gNB-CU-CP), the second network device comprises a gNB Central Unit User Plane (gNB-CU-UP), and the third network device comprises an Access and Mobility Management Function (AMF).

14. A non-transitory computer-readable storage medium storing programming instructions for execution by at least one processor, wherein the programming instructions instruct the at least one processor to perform operations comprising:
  generating, by a second network device, a second data volume report, wherein the second data volume report indicates a volume of data that are of a terminal device and that pass through the second network device, and the second data volume report comprises identifiers of one or more protocol data unit (PDU) sessions and data volumes of the one or more PDU sessions; and
  sending, by the second network device, the second data volume report to a first network device; wherein the first network device comprises a gNB Central Unit Control Plane (gNB-CU-CP), and the second network device comprises a gNB Central Unit User Plane (gNB-CU-UP).

* * * * *

UNITED STATES PATENT AND TRADEMARK OFFICE
CERTIFICATE OF CORRECTION

| | |
|---|---|
| PATENT NO. | : 11,438,739 B2 |
| APPLICATION NO. | : 17/008911 |
| DATED | : September 6, 2022 |
| INVENTOR(S) | : Feng Han et al. |

It is certified that error appears in the above-identified patent and that said Letters Patent is hereby corrected as shown below:

In the Claims

In Column 50, In Line 13, In Claim 13, delete "device" and insert -- device; --.

Signed and Sealed this
Twenty-fifth Day of April, 2023

Katherine Kelly Vidal
*Director of the United States Patent and Trademark Office*